United States Patent
Behm et al.

(10) Patent No.: US 12,105,712 B2
(45) Date of Patent: Oct. 1, 2024

(54) DISTINCT VALUE ESTIMATION FOR QUERY PLANNING

(71) Applicant: Cloudera, Inc., Santa Clara, CA (US)

(72) Inventors: Alexander Behm, Lafayette, CA (US); Mostafa Mokhtar, San Francisco, CA (US)

(73) Assignee: CLOUDERA, INC., Santa Clara, CA (US)

( * ) Notice: Subject to any disclaimer, the term of this patent is extended or adjusted under 35 U.S.C. 154(b) by 0 days.

(21) Appl. No.: 18/305,715

(22) Filed: Apr. 24, 2023

(65) Prior Publication Data

US 2023/0350894 A1    Nov. 2, 2023

Related U.S. Application Data

(63) Continuation of application No. 17/105,014, filed on Nov. 25, 2020, now Pat. No. 11,663,213, which is a continuation of application No. 15/943,496, filed on Apr. 2, 2018, now Pat. No. 10,853,368.

(51) Int. Cl.
| | | |
|---|---|---|
| G06F 16/2453 | (2019.01) | |
| G06F 16/2458 | (2019.01) | |
| G06F 16/835 | (2019.01) | |

(52) U.S. Cl.
CPC .. *G06F 16/24545* (2019.01); *G06F 16/24547* (2019.01); *G06F 16/2471* (2019.01); *G06F 16/8373* (2019.01); *G06F 16/24549* (2019.01)

(58) Field of Classification Search
CPC ................................................. G06F 16/24545
See application file for complete search history.

(56) References Cited

U.S. PATENT DOCUMENTS

| | | |
|---|---|---|
| 6,691,099 B1 | 2/2004 | Mozes |
| 10,157,213 B1 | 12/2018 | Ausin et al. |
| 10,853,368 B2 | 12/2020 | Behm et al. |
| 2003/0126127 A1 | 7/2003 | Abdo |
| 2003/0229617 A1* | 12/2003 | Rjaibi ............... G06F 16/24545 |
| 2004/0010515 A1 | 1/2004 | Sawafta |
| 2008/0059125 A1 | 3/2008 | Fraser et al. |

(Continued)

OTHER PUBLICATIONS

Deolalikar, et al., "Extensive Large-Scale Study of Error in Sampling-Based Distinct Value Estimators for Databases," (2016), 48 pages.

(Continued)

*Primary Examiner* — Van H Oberly
(74) *Attorney, Agent, or Firm* — PERKINS COIE LLP

(57) ABSTRACT

The problem of distinct value estimation has many applications, but is particularly important in the field of database technology where such information is utilized by query planners to generate and optimize query plans. Introduced is a novel technique for estimating the number of distinct values in a given dataset without scanning all of the values in the dataset. In an example embodiment, the introduced technique includes gathering multiple intermediate probabilistic estimates based on varying samples of the dataset, 2) plotting the multiple intermediate probabilistic estimates against indications of sample size, 3) fitting a function to the plotted data points, and 4) determining an overall distinct value estimate by extrapolating the objective function to an estimated or known total number of values in the dataset.

20 Claims, 17 Drawing Sheets

(56) References Cited

U.S. PATENT DOCUMENTS

2015/0154255 A1    6/2015   Cole et al.
2017/0300528 A1   10/2017   Qin et al.
2018/0089843 A1    3/2018   Miecznik
2019/0197162 A1    6/2019   Chiang

OTHER PUBLICATIONS

Flajolet, et al., "HyperLogLog: the analysis of a near-optimal cardinality estimation algorithm," (2007), 20 pages.
Heule, et al., "HyperLogLog in Practice: Algorithmic Engineering of a State of the Art Cardinality Estimation Algorithm," (2013), 10 pages.

\* cited by examiner

DISTINCT VALUE ESTIMATION FOR QUERY PLANNING

CROSS REFERENCE TO RELATED APPLICATIONS

This application is a continuation of U.S. patent application Ser. No. 17/105,014, filed Nov. 25, 2020, now U.S. Pat. No. 11,663,213, and titled "DISTINCT VALUE ESTIMATION FOR QUERY PLANNING," which is a continuation of U.S. patent application Ser. No. 15/943,496, filed Apr. 2, 2018, now U.S. Pat. No. 10,853,368, and titled "DISTINCT VALUE ESTIMATION FOR QUERY PLANNING." Each of the aforementioned applications are incorporated herein by reference in their respective entireties.

BACKGROUND

Distinct value estimation (also referred to as cardinality estimation) generally refers to the problem of estimating the number of distinct elements in a list of elements that may include repeated elements. The problem of distinct value estimation has many applications, but is particularly important (at least in a commercial context) in the field of database technology. For example, the number of distinct values for a particular attribute (e.g., the number of distinct values in a column of a table) represents an important statistic that is utilized by a query planner when generating and optimizing a query plan. FIG. 1 shows a diagram that illustrates how statistical information (e.g., in the form of distinct value estimates) is utilized by a query planner to generate an optimized query plan (or query execution plan) in response to receiving a query. The query plan is generally understood to represent the information necessary to execute a query such as an ordered set of steps defining the data (e.g., tables) to be accessed and the operations (e.g., join operations) to be applied to the accessed data in order to produce a result in response to the query. Given the statistical information regarding the stored data, the query planner runs through and evaluates a number of different possible plans of execution before settling on a query plan that is optimal in view of any one or more criteria and constraints.

DETAILED DESCRIPTION

Figure 1:
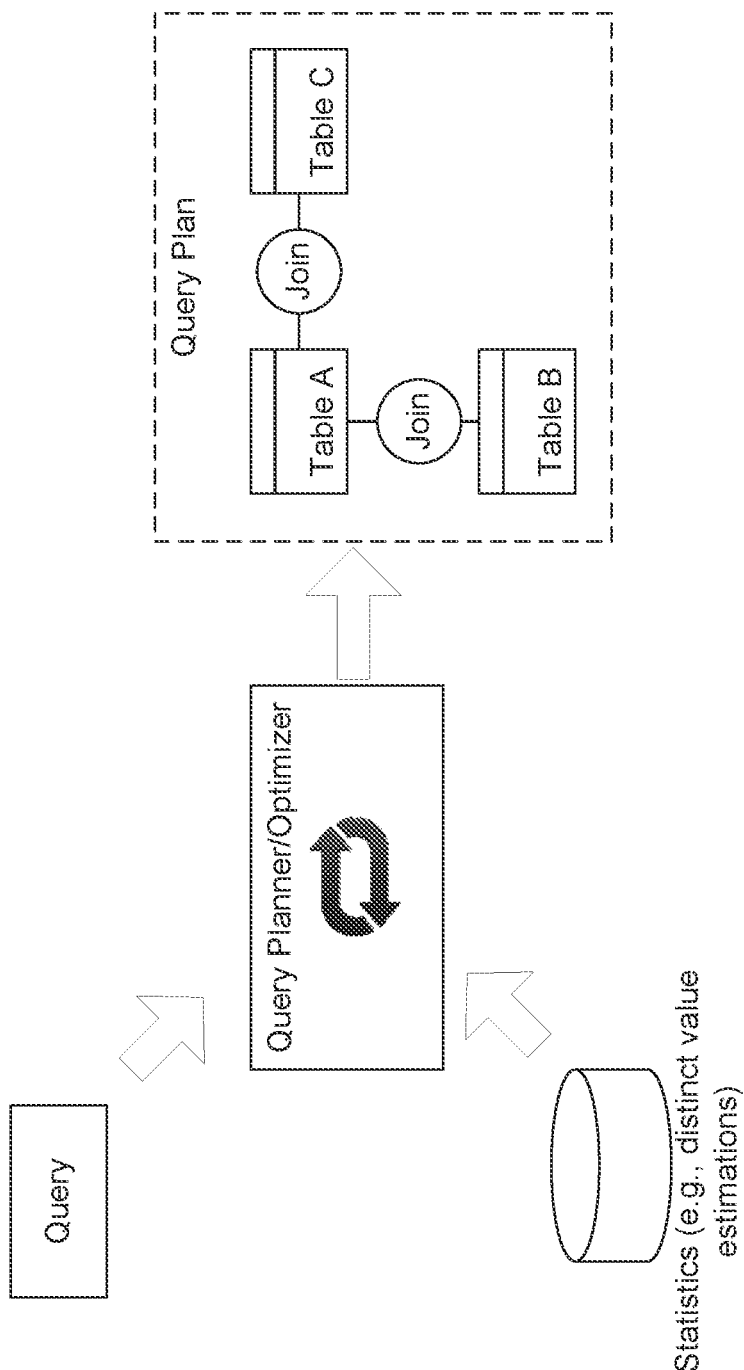
FIG. 1 depicts a diagram illustrating how distinct value estimates are utilized by a query planner to generate a query plan.

From the foregoing, it will be appreciated that specific embodiments of the invention have been described herein for purposes of illustration, but that various modifications may be made without deviating from the scope of the invention. Accordingly, the invention is not limited except as by the appended claims.

Distinct Value Estimation Overview

A number of different techniques can be employed to tackle the problem of distinct value estimation. The most straight forward approach involves scanning and comparing each value in a given list of values to determine a number of distinct values. Such an approach is generally referred to as a naïve solution. Assuming an accurate counting process, a naïve solution that involves scanning each value in a table will produce the most accurate count of the number of distinct values. However, as the amount of data processed increases, the naïve solution becomes increasingly impractical. Current commercial databases can implement tables that include on the order of thousands of columns and trillions of rows constituting on the order of hundreds of terabytes of data. Generally, the amount of computing resources (e.g., memory) required to generate an exact distinct value count is directly proportional to the number of values in the list. When dealing with large datasets (e.g., on the order of thousands of columns and trillions of rows), a naïve solution becomes prohibitively expensive. Instead, a number of techniques have been developed to generate estimates, that although not absolutely accurate, are close enough for certain practical purposes. As will be described in more detail, such techniques generally employ either a sampling-based approach or a probabilistic approach to solve the problem of distinct value estimation. Still, when dealing with large amounts of data, such as in a commercial database context, such approaches to distinct value estimation run into the familiar problems of either requiring too much time, too many computing resources, or producing inaccurate results. In the context of query planning, inaccurate estimates for the number of distinct values can lead to poorly optimized query plans which can greatly slow down query execution.

Introduced herein is a technique for performing distinct value estimation that addresses the problems inherent in the current solutions. In an example embodiment, the introduced technique includes 1) utilizing a probabilistic approach to gather multiple intermediate distinct value estimates based on varying samples of a given list, 2) plotting the multiple intermediate distinct value estimates against indications of sample size (e.g., the number of rows), 3) fitting a function to the plotted data points representing the multiple estimates, and 4) determining an overall distinct value estimate by extrapolating the objective function to an estimated or known total number of values in the list. The term "list" is used herein to refer to any sort of grouping of data that includes multiple elements. Accordingly, as used herein, the term "list" shall be understood to encompass terms such as "set," "multiset," "dataset," "population," "group," etc.

The introduced technique for distinct value estimation retains the advantages of current sampling and probabilistic approaches such as accuracy and memory bounding (in the case of probabilistic), while overcoming inherent limitations in existing techniques by, for example, not needing to scan all of the values in a given set and only requiring a single pass to scan the values. The introduced technique also has particular advantages for statistics maintenance, for example, in a database context. For example, current naïve and sampling-based approaches typically re-compute statistics from scratch each time new values are added or changes. Current probabilistic approaches can accommodate more values being added, but typically do not handle the removal of values well. This significantly reduces the utility of such approaches in a database context in which statistics are maintained on tables including ever changing values. As will be described in more detail, the introduced technique computes a function that maps a number of values to a distinct value estimate. In this sense, the introduced technique can accommodate additions and deletions without needing to process the added or deleted data in order to produce a sufficiently accurate estimate of the number of distinct values. Note, the function can of course be recomputed in response to significant changes in the data, but need not be recomputed each time small of amounts of data are added or deleted. This ability to produce sufficiently accurate distinct value statistics using bounded memory and reduced processing expenditures (in time and resources) represents a significant improvement in the field of database technology.

Sampling-Based Approaches to Distinct Value Estimation

Sampling-based approaches to distinct value estimation operate on the premise that scanning less than all of the data in a given dataset may produce an estimate that is close enough to actual cardinality to satisfy certain practical applications. In other words, the basic process of scanning and comparing multiple values (as applied in the naïve solution) is performed, but on less than all of the values in the given list. In some embodiments, a sampling-based approach includes randomly selecting some values from the list (e.g., in a given column), performing the naïve solution to scan and compare the randomly selected values, and then applying some type of statistical analysis to the returned distribution of scanned values in order to produce an estimate for the number of distinct values in the overall list. Examples of some known sampling-based distinct value estimators include the Schlosser estimator, the Jackknife estimator, and the Chao-Lee estimator.

The sample rate utilized may differ depending on the specific estimator algorithm applied and the application requirements (e.g., error tolerance, processing time, and/or available computing resources) but is generally on the order of 1% of the total list. Scanning and comparing 1% of the total values in a given list of values can sometimes lead to significant savings over scanning and comparing the entire list, but the actual memory required will depend on the values selected. For example, if the randomly selected sample happens to include all of the distinct values in a given list, the memory required to store entries for each value will be the same as the naïve approach. Further, when dealing with large enough datasets, the randomly selected sample may still represent a significant amount of data. For example, 1% of a dataset that includes 500 terabytes of data still represents 5 terabytes of data. Still further, reducing the sampling rate to save time and computing resources tends to increase error in the resulting estimates, which as previously mentioned, can lead to significant slowdown when executing query plans based on the estimates.

Probabilistic Approaches to Distinct Value Estimation

An alternative to the sampling-based approach relies on a technique called probabilistic counting. Approaches to distinct value estimation that employ probabilistic counting generally involve generating a randomized representation of each value (e.g., using a hash function), analyzing the generated representations for certain observable bit patterns, counting the number of occurrences of the certain bit patterns, and then estimating the number of distinct values based on probabilities of the observed bit patterns occurring. The underlying concept is based on an assumption that the rarer the pattern observed, the more likely that multiple patterns that are less rare have already been observed. Examples of existing probabilistic estimators include LogLog and HyperLogLog. Probabilistic estimators such as LogLog and HyperLogLog rely on the observation that, given a proper hash function, an arbitrary list of values can be transformed into an approximately evenly distributed list of pseudo-random values (i.e., the binary hash-values). Patterns in the hash values can then be used to estimate the number of distinct values in the arbitrary list of values. For example, estimators such as LogLog and HyperLogLog may count the number of 0 (zero) bits occurring at or near the beginning of the generated hash values. In such a list of pseudo-random values, the probability of observing a hash value that begins with k zeros is once in every $2^k$ elements, on average. Accordingly, the number of distinct values in a given list of data can be estimated based on the length of the longest sequence of zeros observed in the hash values.

A weakness in the above described approach is that a single outlier can skew the distinct value estimate. LogLog attempts to address this issue by splitting the max leading zero counts based on the hash values into multiple buckets and then calculating the arithmetic mean of the max zero counts before returning a distinct value estimate. An example LogLog algorithm involves 1) hashing each value in the list, 2) assigning each hash value to a particular one of multiple buckets based on the first few bits in each hash value, 3) using the remaining bits in each hash value to update the max leading zero counts for each bucket, 4) calculating the arithmetic mean of the final max leading zero counts for each bucket, and 5) generating an estimate for the number of distinct values as some function of $2^k$ where k is the average max leading zero count across all the buckets. HyperLogLog improves on the LogLog algorithm to further reduce the effects of outliers by dropping a certain percentage of outlier buckets having the highest max leading zero counts and further by taking the harmonic mean instead of the arithmetic mean to calculate the average max leaning zero count k. The actual math behind probabilistic estimators such as LogLog and HyperLogLog is considerably more complex than as described above, but is beyond the scope of this disclosure. Additional information, for example, regarding HyperLogLog can be found in Flajolet, Philippe; Fusy, Eric; Gandouet, Oliver; and Meunier, Frederic, "HyperLogLog: the Analysis of a Near-optimal Cardinality Estimation Algorithm," Conference on Analysis of Algorithms, Discreet Mathematics and Theoretical Computer Science, 127-147, 2017.

Probabilistic counters such as LogLog and HyperLogLog solve the unbounded memory issue that render naïve approaches to distinct value counting and many sampling-based approaches to distinct value estimation impractical for large-scale datasets. Regardless of the number of total values in a given list and/or the overall size of the data, the process performed by a probabilistic estimator can be bounded, depending on the data structures employed for the buckets. For example, depending on the implementation, a HyperLogLog estimator may utilize less that 16 kilobytes of memory. However, probabilistic counters such as LogLog and HyperLogLog are still limited in many contexts that involve large scale datasets of known size because they require scanning and hashing all of the values in a given list. This generally results in a estimation process that is still relatively slow. For example, using a probabilistic estimator such as HyperLogLog may take several hours to generate a distinct value estimate for a table that includes 2000 columns. Probabilistic estimators such as HyperLogLog are, on their own, more effective at generating continually updating distinct value estimates based on steams of data coming through instead of tackling the existing large-scale datasets that are typically encountered in a database technology context.

Improved Approach to Distinct Value Estimation

Figure 2:
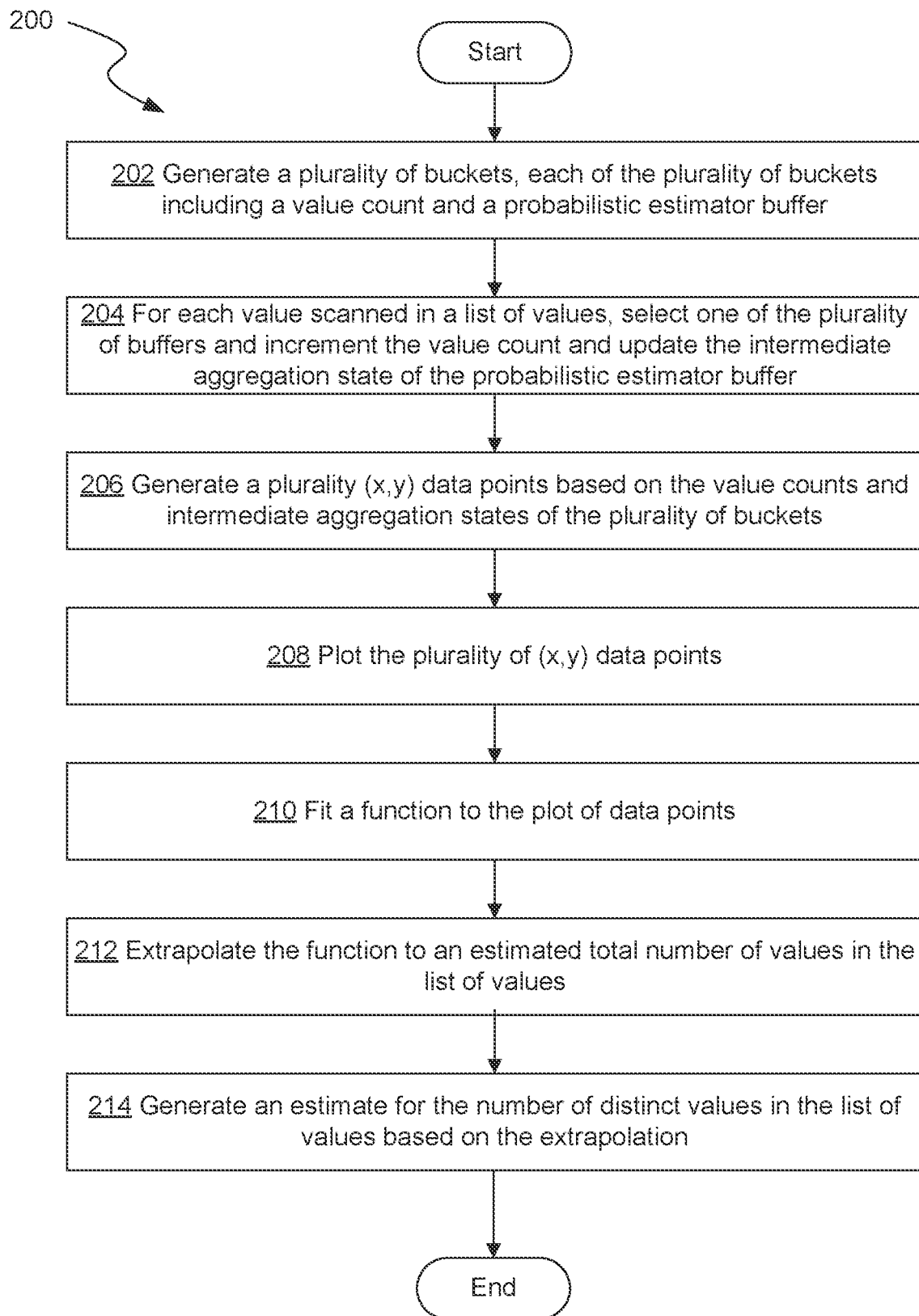
FIG. 2 depicts a flow chart illustrating an example method for distinct value estimation.

FIG. 2 is a flow chart of an example process 200 for performing distinct value estimation based on the technique introduced herein. One or more steps of the example process 200 can be performed by a processing component associated with a database system such as a query planner or optimizer (e.g., as part of the environment depicted in FIG. 7). More generally, one or more steps of the example process 200 may be performed by any one or more of the components of the example processing system 1200 described with respect to FIG. 12. For example, the example process 200 depicted in FIG. 2 may be represented in instructions stored in one or more memory units that are then executed by one or more processing units. The process 200 described with respect to FIG. 2 is an example provided for illustrative purposes and is not to be construed as limiting. Other processes may include more or fewer steps or may perform steps in a different order than depicted in FIG. 2 while remaining within the scope of the present disclosure.

The example process 200 begins at step 202 with creating and/or maintaining a plurality of data structures that will be used to store information generated using a probabilistic estimator such as HyperLogLog. For the purposes of this disclosure, these data structures will be referred to as "buckets," however other embodiments may utilize other types of data structures. Each of the plurality of buckets includes a value count indicator and a probabilistic estimator buffer, for example, representative of an intermediate probabilistic estimation state. The "value count indicator" in this context may be an integer representative of the number of values aggregated into a particular bucket to generate the intermediate probabilistic estimation state. In the context of a table that includes columns and rows of values, the "value count indicator" may be referred to as a "row count indicator" in that it represents the number of rows in the table that have been aggregated into a particular bucket. The "probabilistic estimator buffer" may include a fixed (e.g., 1024 bytes) amount of binary information (i.e., a sequence of zeros and ones of fixed length) that may be based on the application of a hash function to incorporated values using a probabilistic estimation algorithm such as HyperLogLog. In other words, the "value count indicator" or "row count indicator" represents the number of values or rows scanned by the probabilistic estimator, and the "probabilistic estimator buffer" represents an output generated by applying a probabilistic estimation algorithm to the scanned values or rows.

Figure 3:
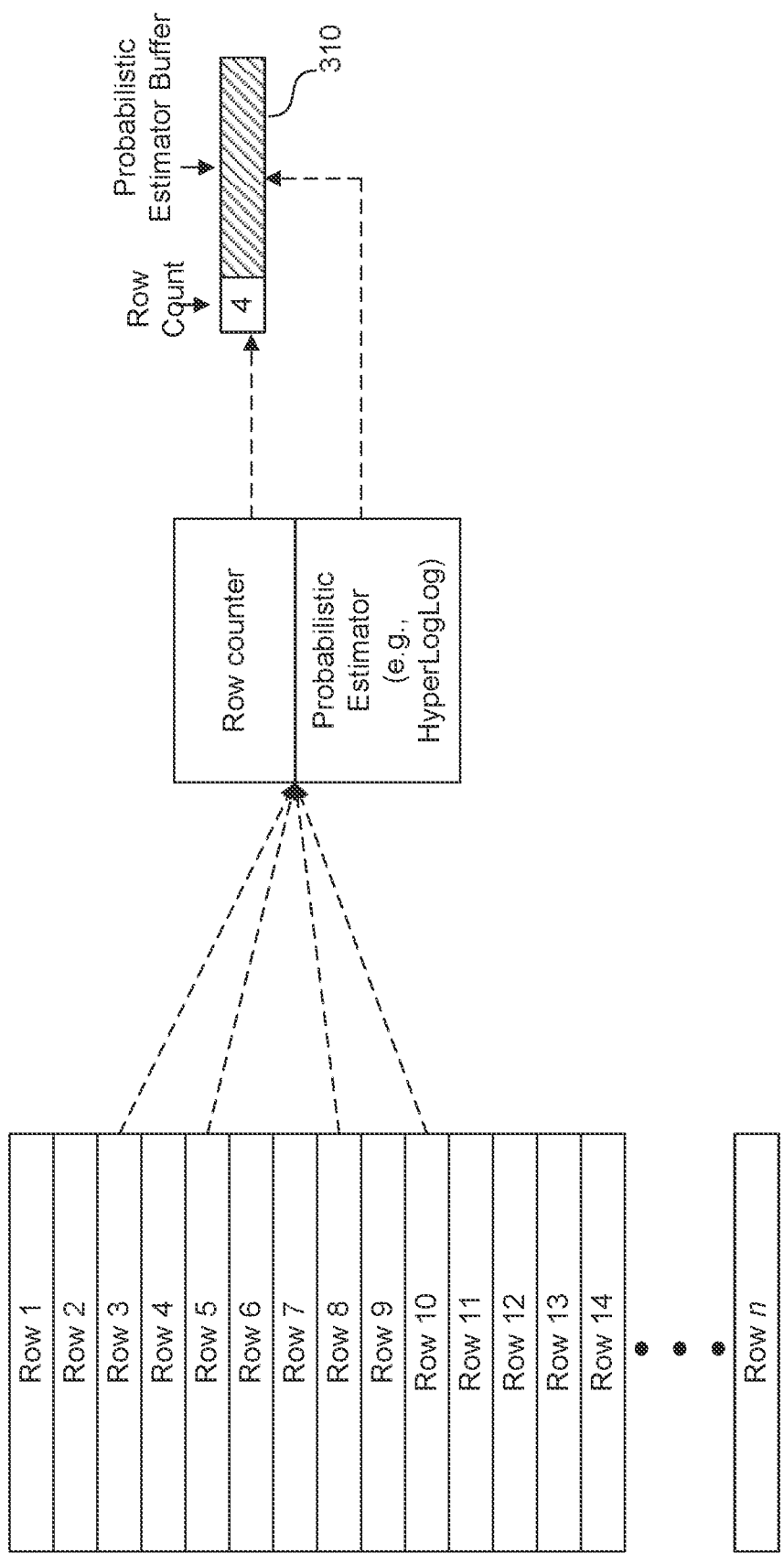
FIG. 3 depicts a diagram illustrating how buckets are created and maintained, according to an embodiment of the disclosed technique for distinct value estimation.

The example process 200 continues at step 204 with, for each value scanned, incrementing the value count indicator and updating the probabilistic estimator buffer in one of the plurality of buckets. This step is described with reference to FIG. 3 that further illustrates how buckets are created and maintained, in some embodiments. Specifically, FIG. 3 shows an example column of a table that includes multiple rows 1 through n. For each row scanned, the example process selects one of the plurality of buckets (e.g., bucket 310 shown in FIG. 3), increments the row count indicator and updates the probabilistic estimator buffer. For example, FIG. 3 shows an example state where four rows have been scanned (rows 3, 5, 8, and 10), therefore the row count indicator in the example bucket 310 is currently set at "4." The probabilistic estimator buffer therefore represents an output based on applying a probabilistic estimator process such as HyperLogLog to the values in the four rows. Specifically, as previously discussed, the process of generating the probabilistic estimator buffer may include first applying a hash function to the values read from the rows to generate a binary hash value and then analyzing the generated hash values, for example, to identify certain bit patterns such as sequences of leading zeros. Notably, the probabilistic estimator buffer of the bucket 310 represents an intermediate estimation state since it is based on only four of the total n rows.

As previously mentioned, multiple buckets can be created and maintained, where each of the multiple buckets includes a respective value count and probabilistic estimator buffer. The number of buckets maintained can vary and may depend on the requirements of a given implementation. In the context of a database system, a suitable number of buckets has been empirically determined to be approximately 32 buckets.

Returning to FIG. 2, the example process 200 continues at step 206 with generating multiple data points based on the multiple buckets. Specifically, each bucket may correspond to a data point that includes a value count (or a row count) and a distinct value estimation based on the intermediate aggregation state of the probabilistic estimator buffer. Recall that probabilistic estimators such as HyperLogLog are configured to produce an estimate of the number of distinct values in a given list of values. Again with reference to FIG. 3, a two-dimensional data point (e.g., in the form (x,y)) can be generated based on the content of the bucket 310. In this example, the two-dimensional data point would include the row count (4) as the x-value and a distinct value estimation based on the probabilistic estimator (e.g., HyperLogLog) buffer as the y-value. This step of generating a data point is repeated for each of the multiple buckets.

A distinct value estimation based on the probabilistic estimator buffer in a single bucket is not expected to be accurate in this case because (as explained with respect to FIG. 3), the estimation is made after scanning less than all of the values (or rows) in the given list (or column). For example, the distinct value estimation made based on the bucket 310 depicted in FIG. 3 is made based on scanning only 4 out of the total n rows. Instead, each data point based on each bucket can be plotted (at step 208) to generate an overall estimate (at step 214) of the number of distinct values in a given dataset by fitting a function (at step 210) to the plotted data points and extrapolating the function (at step 212) to an estimated or known total number of values in the dataset.

Figure 4:
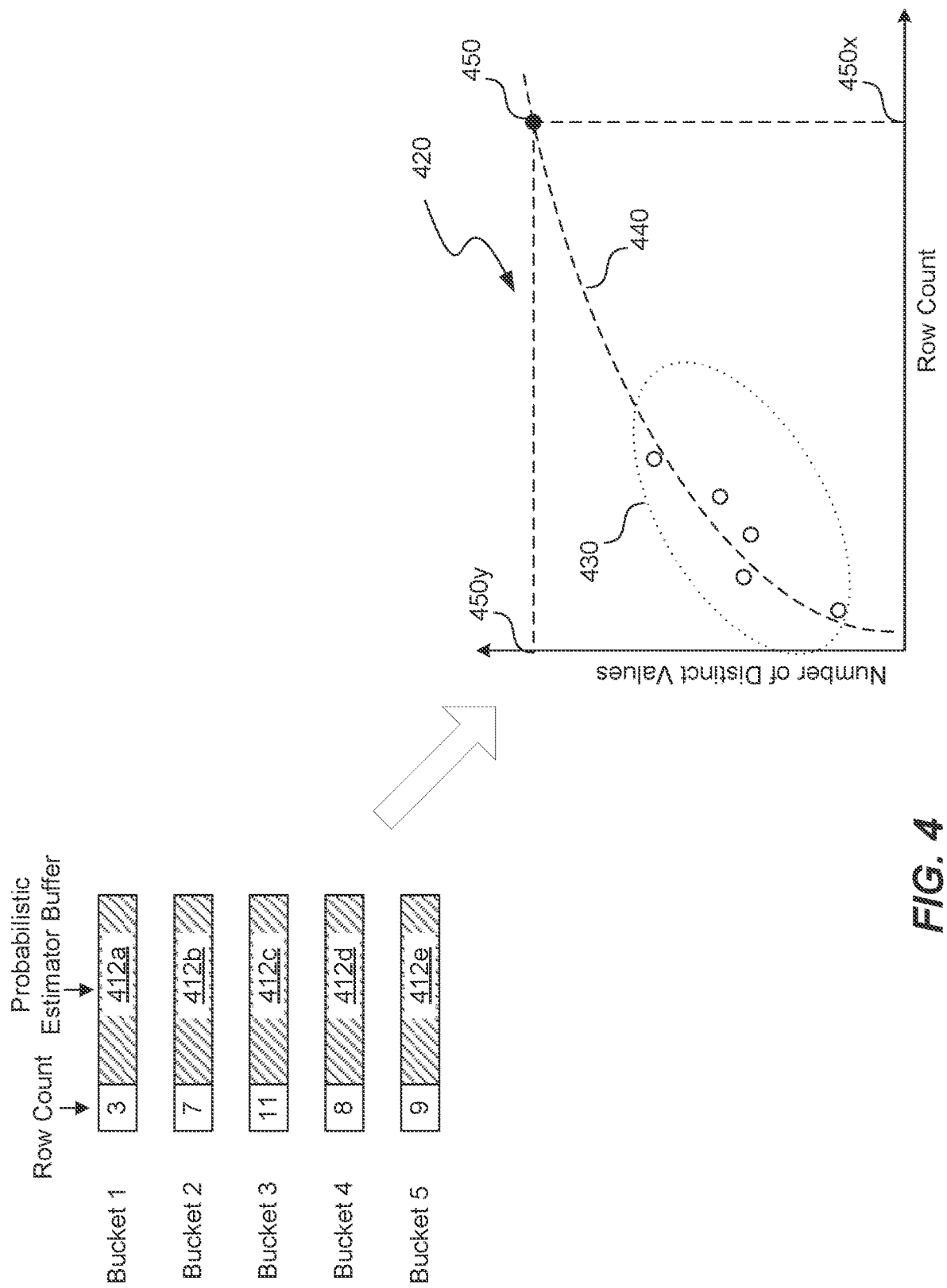
FIG. 4 depicts a diagram illustrating the plotting of data points based on multiple buckets to generate a distinct value estimation, according to an embodiment of the disclosed technique.

For example, FIG. 4 shows a diagram that illustrates the plotting of data points based on the multiple buckets to generate an overall estimate for the number of distinct values. In the example depicted in FIG. 4, five buckets are shown, each of the five buckets including a row count and an associated probabilistic estimator buffer 412*a-e*. Specifically, the first bucket includes a probabilistic estimator buffer 412*a* based on 3 scanned rows, the second bucket includes a probabilistic estimator buffer 412*b* based on 7 scanned rows, the third bucket includes a probabilistic estimator buffer 412*c* based on 11 scanned rows, and so on. Five buckets are shown here for illustrative simplicity and clarity, however, as previously discussed, the actual number of buckets may be different (e.g., 32). In this simplified example, each of the five buckets corresponds to one of the five corresponding two-dimensional (x,y) data points in the corresponding plot 420. The (x,y) data points forming the plot 420 are shown within the dotted line oval 430. As shown the plot has the row count (or value count) on the x-axis and the number of distinct values on the y-axis.

The example process 200 utilizes the multiple plotted data points (at step 210) to fit a function to the data points. This step may, in some embodiments, include first scaling the x and y values for each of the data points. For example, the x and y values in each of the data points may be scaled to a value between 0 and 1. In any case, the step of fitting a function to the plotted data points may include performing a curve fitting process to fit a curve 440 based on any one of several objective functions to the data points. Objective functions that can be applied may include, for example, linear functions (e.g., of form: $f(x)=a+b*x$), logarithmic functions (e.g., of form: $f(x)=a+b*\log(x)$), power functions (e.g., of form: $f(x)=a+b*\text{pow}(x, c)$), and sigmoid functions (e.g., of form: $f(x)=a+b*(c/(c+\text{pow}(d, -x)))$). A curve fitting process (e.g., based on the MPFIT C library) can be applied to select the best values for the parameters a, b, c, and d in each of the aforementioned objective functions based on the values of the plotted data points. Next, a statistical process such as least mean squares fitting can be applied to select one of the objective functions that best fits the plotted data points.

Once a function is fit based on the plotted data points, the example process continues at step 212 with extrapolating the function to identify a number of distinct values that corresponds with an estimated or known total number of rows (or values) in the dataset. In other words, this step involves plugging in the estimated or known total number of values (or rows) as the x-value into the function arrived at in step 210 and solving for y. For example, FIG. 4 shows a point 450 that represents an extrapolation of the function (represented by curve 440) out to some estimated or known total number of rows 450*x*. The y-value 450*y* of point 450 represents the overall estimate of the total number of distinct values in the dataset based on the estimated or known total number of values (or rows) 450*x*.

In general, the accuracy of the number of distinct values estimated using this technique will increase as more data points are plotted. For example, the five data points as shown in FIG. 4 and even 32 data points corresponding to 32 buckets may not be sufficient to generate an estimate for the number of distinct values with an error low enough for many practical applications (such as query optimization).

More than 32 buckets, each with a continually updated probabilistic estimator buffer, can be created and maintained using the aforementioned processes of scanning the values in a dataset to generate more data points; however, scanning more values will tend to significantly increase the required computing resources and extend processing times. Instead, the introduced technique relies on the ability to merge the probabilistic estimator buffers to effectively generate additional buckets corresponding to new data points. This ability to merge buffers is an inherent property of probabilistic estimators such as HyperLogLog. Essentially, two or more buffers can be merged to form a new buffer that reflects a state of having performed the probabilistic counting process using all of the values of the two merged buffers.

Figure 5:
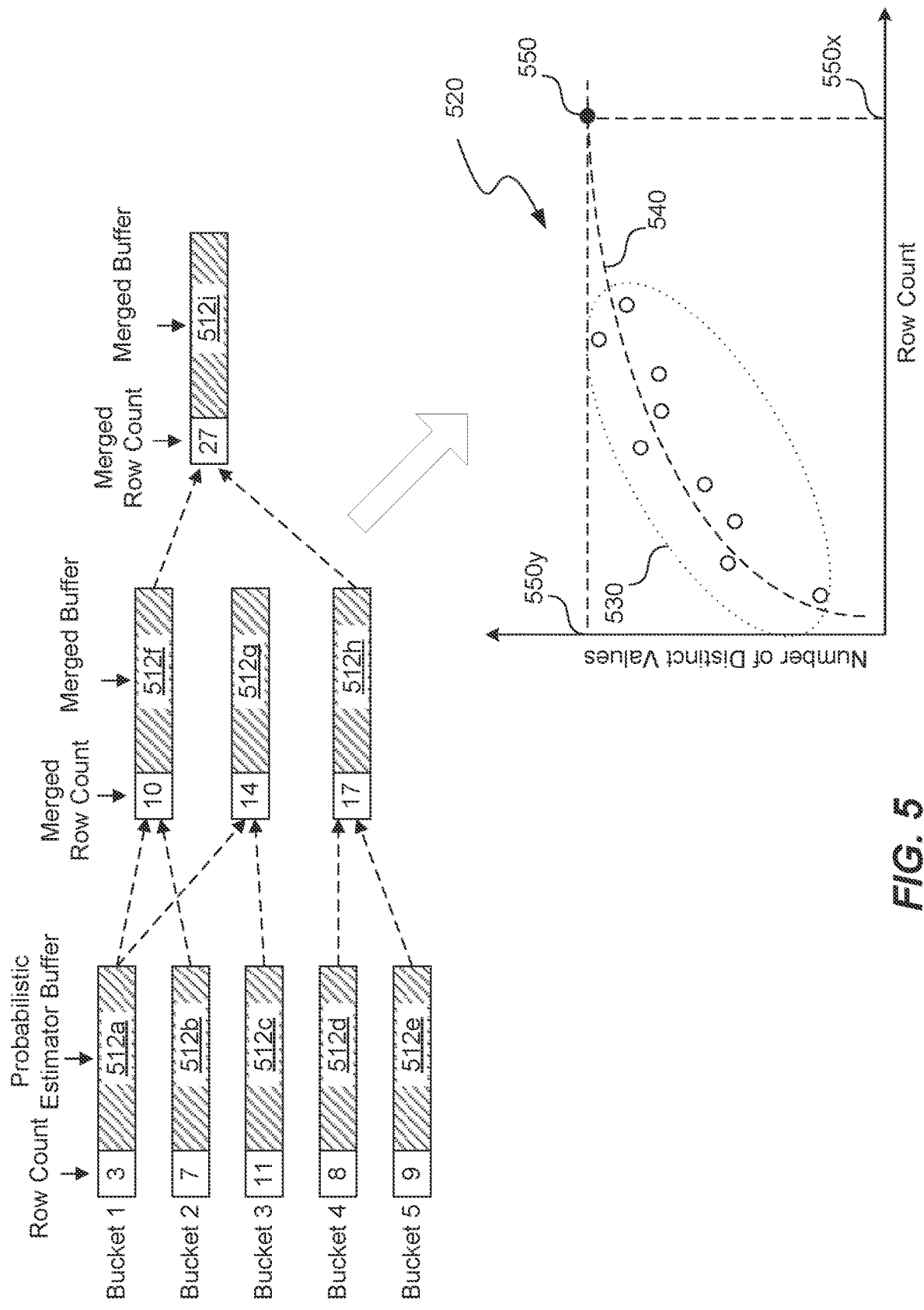
FIG. 5 depicts a diagram illustrating the merging of buckets to generate additional data points, according to an embodiment of the disclosed technique for distinct value estimation.

Buckets can be merged, by applying the ability to merge buffers, to form new buckets, and thereby create new data points. For example, two or more buckets can be merged by summing the value (or row) counts and merging the buffers of the two or more buckets. FIG. 5 shows a diagram that illustrates the merging of buckets to form new buckets. FIG. 5, shows an initial set of five buckets, for example, similar to the five buckets described with respect to FIG. 4. Each of the five initial buckets includes a row count and a corresponding probabilistic estimator buffer 512*a-e*. As indicated in FIG. 5, buckets 1 and 2 can be merged to form a new bucket. Specifically, this new bucket includes a row count of "10" which represents the sum of the row counts for buckets 1 and 2. The corresponding probabilistic estimator buffer 512*f* of this new bucket is based on merging the buffer 512*a* of bucket 1 and the buffer 512*b* of bucket 2. Similarly, buckets 1 and 3 are shown to merge to form a new bucket that includes buffer 512*g* and buckets 4 and 5 are shown to merge to form a new bucket that includes buffer 512*h*. In some embodiments, these new buckets resulting from merging original buckets can further be merged with other buckets to form additional buckets. For example, the new bucket resulting from the merging of buckets 1 and 2 can be merged with the new bucket resulting from the merging of buckets 4 and 5 to form another new bucket that includes buffer 512*i*.

The scenario depicted in FIG. 5 illustrates how additional data points can be generated based on only a few original buckets that are a result of having scanned only a fraction of the rows in a given table. In this example, the five data points based on the initial five buckets has been extended to nine total data points using minimal additional processing and/or memory consumption. These additional data points generated through merging buckets can be plotted along with the data points based on the initial buckets to improve the accuracy of the function fitting process at step 210. For example, FIG. 5 shows a plot 520 (e.g., similar to plot 420) that includes nine total (x,y) data points (shown within dotted line oval 530). A function (represented by curve 540) can then be fit to the plotted date points 530 to extrapolate a point 550, where the x-value 550*x* represents an estimated or known total number of rows and the y-value 550*y* represents the overall estimate of the total number of distinct values in the dataset based on the estimated or known total number of values (or rows) 550*x*.

Notably, FIG. 5 shows only a few example bucket merges that can result from an initial set of five buckets. The merges are not limited to two buckets at a time. For example, all five buckets 1 through 5 can be merged to form a new bucket and thereby generate a new data point. In other words, given a fixed number of probabilistic estimator intermediates, any unique subset of the intermediates can be combined to create new data points. With as few as five initial buckets, many additional points can be generated.

As previously stated, the accuracy of the final distinct value estimation will tend to increase as the number of plotted data points increases. Based on this fact, the most accurate estimation would likely result by plotting data points corresponding to every possible combination of initial buffers. In some embodiments, a brute force technique can be employed to generate data points based on all such combinations. However, diminishing increases in estimation accuracy are realized above a certain number of data points. Further, a brute force approach to generate data points based on all possible bucket combinations can lead to higher cost both in processing time and expended computing resources. Accordingly, in some embodiments, the process may involve generating additional data points based on fewer than all possible bucket combinations. The number of data points needed to produce a distinct value estimation with a sufficiently low error will depend on the data processed as well as the requirements of the specific implementation.

In a database technology context, specifically where estimations are utilized by a query planner or optimizer to generate a query plan, a sufficient number of data points has been empirically determined to be approximately $m^2$, where m equals the number of initial buckets with buffers generated based on the scanning of values (as opposed to the merging of buffers). For example, as previously mentioned, in a preferred embodiment, 32 buckets are maintained, each with a corresponding probabilistic estimator buffer. An optimal total number of data points that can be generated, for example, through merging various combinations of the 32 buckets is $32^2$, or 1024. Again, this figure represents an example amount of data points and is not to be construed as limiting. The number of data points generated may differ in other embodiments.

Figure 6:
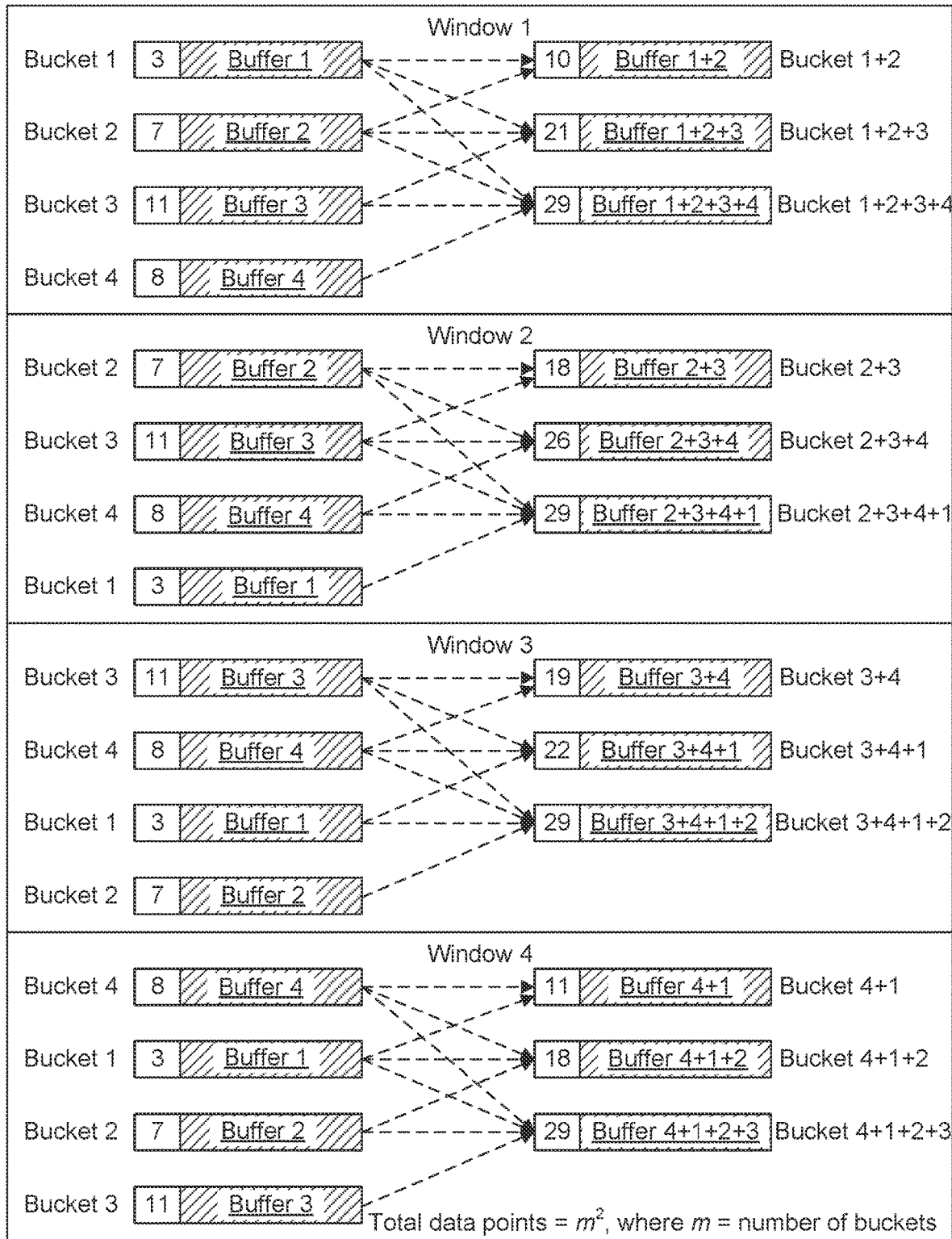
FIG. 6 depicts a diagram illustrating an example method for generating additional data points based on a rolling window approach, according to an embodiment of the disclosed technique for distinct value estimation.

Several different approaches can be taken to the generate the $m^2$ data points to produce an accurate distinct value estimation. An example method of generating $m^2$ data points based on an m initial bucket is described with respect to FIG. 6. The generation method described with respect to FIG. 6 successively merges buckets in a rolling window that has a size based on the initial number of buckets. For example, given an initial set of four buckets 1, 2, 3, and 4, window 1 includes merging buckets 1 and 2, merging buckets 1, 2, and 3, and merging buckets 1, 2, 3, and 4. The window is then shifted down one bucket, such that the order of buckets is now 2, 3, 4, and 1. Accordingly, window 2 includes merging buckets 2 and 3, merging buckets 2, 3, and 4, and merging buckets 2, 3, 4, and 1. This process is repeated for a number of times equal to the initial set of buckets. For example, in the scenario depicted in FIG. 6, this rolling window technique is repeated four times (windows 1-4). The result of this merging process is m initial buckets and $m^2-m$ new buckets based on the merging. For example, by merging the initial 4 buckets (of FIG. 6), the method produces 12 additional buckets for a total of 16 buckets. These 16 buckets correspond with the 16 data points that can then be plotted to produce and distinct value estimation.

Notably, this generation technique produces repeated buckets in each window representing the merging of all m initial buckets. For example, in FIG. 6, window 1 produces a first new bucket based on merging buckets 1, 2, 3, and 4; window 2 produces a second new bucket based on merging buckets 2, 3, 4, and 1, and so on. Each of these new buckets includes the same row counts and merged buffers, and accordingly would correspond with new data points having the same x and y values. Plotting these repeated data points where all buckets are merged will tend to bias the curve fitting process to fit that data point. This is beneficial for the purposes of the disclosed technique since such data points (that are based on the scanning of the most values) will tend to be the most accurate.

Example Implementation with a Low-Latency Query Engine

As previously discussed, the introduced technique for distinct value estimation may be implemented in a database context to assist in the generation of optimized query plans. FIGS. 7-11F describe an example operating environment that includes a low-latency query engine in which the introduced technique can be implemented. A person having ordinary skill will recognize that the example implementation described with respect to FIGS. 7-11F is provided for illustrative purposes, but that the above described technique for distinct value estimation can similarly be applied in other types of database contexts as well as in other contexts unrelated to databases.

Figure 7:
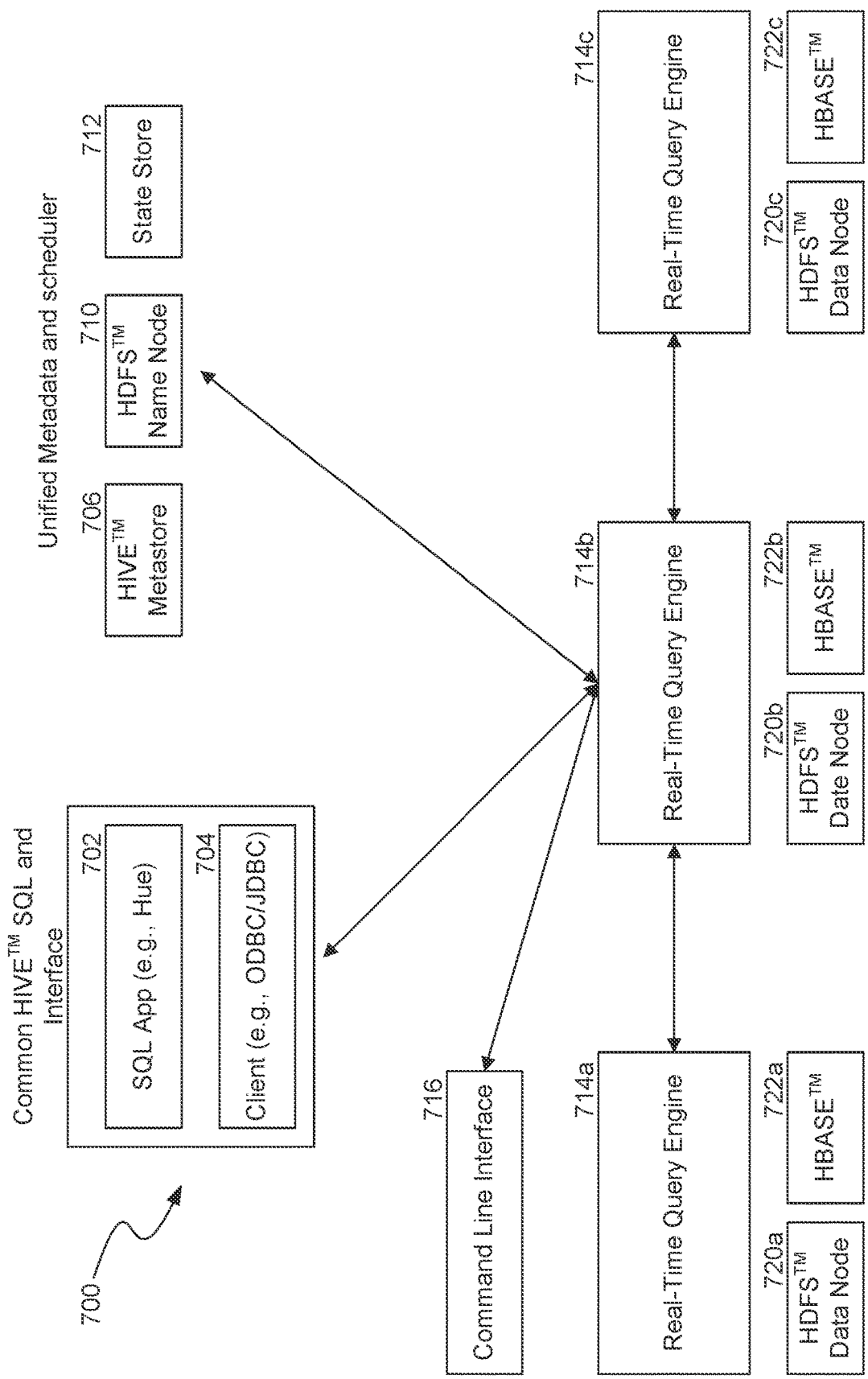
FIG. 7 depicts a diagram illustrating an example environment in which the disclosed technique for distinct value estimation can be implemented.

FIG. 7 shows a block diagram of an example operating environment 700. Example environment 700 depicts a client 704 such as Java Database Connectivity (JDBC) client, Open Database Connectivity (ODBC) client, and the like that provides API and other tools for connecting and/or accessing a Hadoop cluster. SQL applications 702 such as Hue, provide a user interface for Hadoop to run queries or jobs, browse the HDFS, create workflows, and the like. Environment 700 also includes a command line interface 716 for issuing queries to the low-latency query engine daemons running on data nodes 720a-c that comprise the Hadoop cluster. In some embodiments, the client 704, the web application 702 and the command line interface 716, each or together may be commonly referred to as a client.

Environment 700 depicts a plurality of data nodes 720a-c. A low-latency query engine daemon runs on each of the data nodes. A low-latency query engine daemon is a long running process that coordinates and executes queries. Each instance of the low-latency query engine daemon can receive, plan (e.g., using distinct value estimates generated using the introduced technique) and coordinate queries received via the clients 702/704. For example, the low-latency query engine can divide a query into fragments, which are distributed among remote nodes running an instance of the low-latency query engine for execution in parallel. Some of the data nodes 720a-c may run just HDFS, while others may run HBase region servers 722a-c. The queries are executed directly on the HDFS (e.g., 720a-c) and/or HBase (e.g., 722a-c).

Environment 700 depicts unified metadata and scheduler components such as Hive metastore 706, YARN 708, HDFS name node 710 and/or state store 712. The Hive metastore 706 includes information about the data available to the low-latency query engine. Specifically, the Hive metastore 706 includes the table definition, i.e., mapping of the physical data into the logical tables that are exposed. In some embodiments, the Hive metastore 706 may include statistical information such as volume and distribution of data in various tables as well as statistical information on specific columns and partitions of such tables. This statistical information stored in the Hive metastore 706 may include, for example, distinct value estimations made using the disclosed technique. The statistical information can be utilized by the query planner 916 to generate optimized query plans. The YARN 708 performs job scheduling and cluster resource management. The HDFS name node (NN) 110 includes the details of the distribution of the files across data nodes to optimize local reads. In one implementation, the name node

710 may even include information concerning disk volumes the files sit on, on an individual node.

The state store 712 is a global system repository which runs on a single node in the cluster. The state store 712 in one implementation can be used as a name service. All low-latency query engine daemons, at start up, can register with the state store and get membership information. The membership information can be used to find out about all the low-latency query engine daemons that are running on the cluster. The state store 712, in a further implementation, can be used to provide metadata for running queries. The state store 712 can cache metadata and distribute the metadata to the low-latency query engine daemons at start-up or another time. When the state store fails, the rest of the system may continue to operate based on last information received from the state store. In a further implementation, the state store can store and distribute other system information such as load information, diagnostics information, and the like that may be used to improve the functioning and/or performance of the Hadoop cluster.

Figure 8:
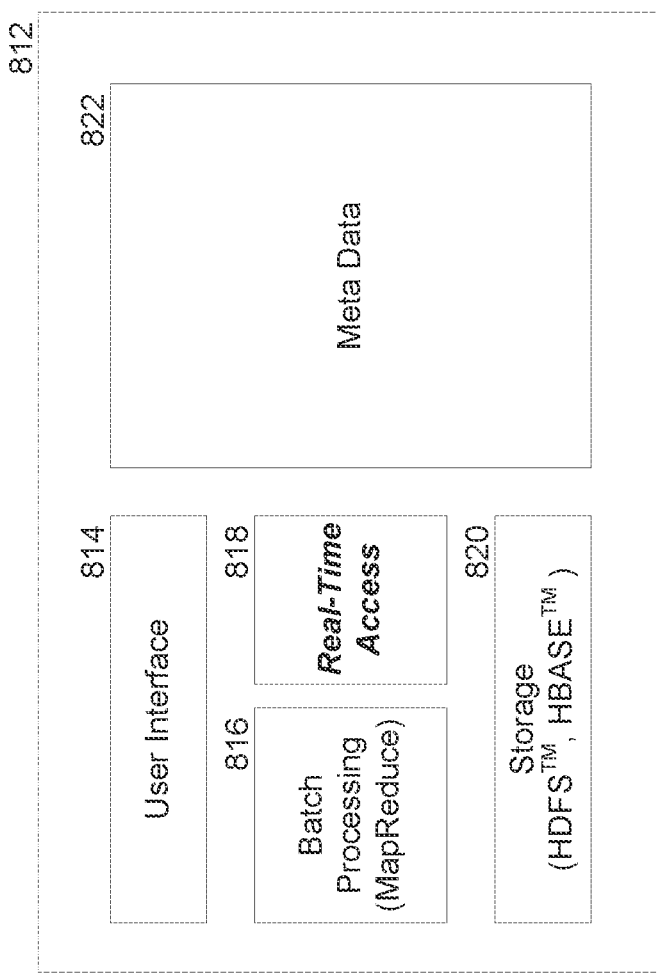
FIG. 8 depicts a block diagram illustrating example components of a unified platform supporting batch-oriented and real-time, ad hoc queries.

FIG. 8 depicts a block diagram illustrating example components of a unified Hadoop platform 812 supporting batch-oriented and real-time, ad hoc queries. The unified Hadoop platform 812 supports distributed processing and distributed storage. The unified Hadoop platform 812 includes a user interface 814, storage 820 and metadata 822 components. The user interface 814 includes Hive interfaces such as ODBC driver, JDBC driver, Hue Beeswax, and the like. The user interface 814 also includes SQL support. Via the user interface 814, queries can be issued, data can be read from or written to storage 820, etc. The storage 820 includes HDFS and/or HBase storage. The HDFS may support various file formats, including but not limited to: text file, sequence file, RC file, Avro, and the like. Various compression codecs including snappy, gzip, deflate, bzip, and the like may also be supported. The metadata 822 may include, for example, information such as tables, their partitions, schema-on-read, columns, types, table/block locations, and the like. The metadata 822 may leverage existing Hive metastore, which includes mapping of HBase table, predicates on row key columns mapped into start/stop row, predicates on other columns mapped into single column value filters, and the like.

Existing Hadoop platform uses a batch-oriented query engine (i.e., MapReduce) for batch processing 816 of Hadoop data. The batch processing capability of MapReduce is complemented by a real-time access component 818 in the unified Hadoop platform 812. The real-time access component 818 allows real-time, ad hoc SQL queries to be performed directly on the unified storage 820 via a distributed low-latency query engine that is optimized for low-latency. The real-time access component 818 can thus support both queries and analytics on big data. Existing query engines (e.g., MapReduce), on the other hand, feature tight coupling of the storage, metadata and the query, which means that such query engines would need to read the data remotely from Hadoop, and convert it into their storage format before they can do queries because of the tight coupling.

Figure 9B:
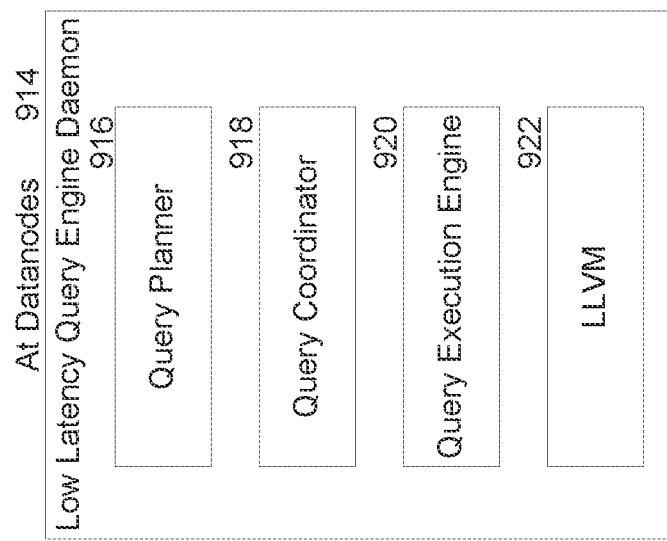
FIGS. 9A-9B depict block diagrams of example components of an installation manager and a low latency query engine installed on a data node in a Hadoop cluster to provide interactive, real-time Structured Query Language (SQL) queries directly on a unified storage layer.
Figure 9A:
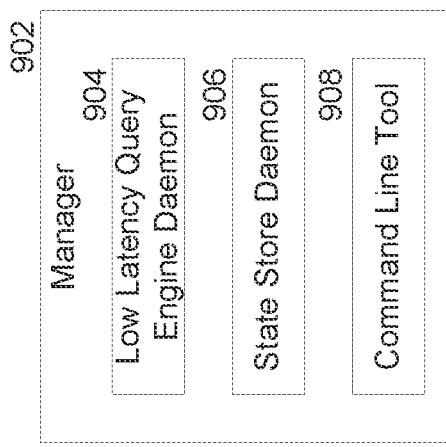

FIG. 9A depicts a block diagram of example components of an installation manager 902 for installing components of a low-latency query engine in a Hadoop cluster to provide interactive, real-time SQL queries directly on a unified storage layer.

The manager 902 is an installation manager that can automatically install, configure, manage and monitor the low-latency query engine. Alternately, the low-latency query engine may be installed manually. The installation manager 902 installs three binaries including a low-latency query engine daemon 904, a state store daemon 906 and a low-latency query engine shell 908. As described above, the low-latency query engine daemon 904 is a service or process that plans and executes queries against HDFS and/or HBase data. The low-latency query engine daemon is installed on each data node in the cluster. The state store daemon 906 is a name service that tracks the location and status of all the low-latency query engine daemon instances in the cluster. The state store daemon 906 can also be a metadata store for providing metadata and/or other diagnostic information in some implementations. The low-latency query engine shell 908 is a command line interface for issuing queries to a low-latency query engine daemon, and is installed on a client.

FIG. 9B depicts a block diagram of example components of a low-latency query engine daemon installed on each data node in a Hadoop cluster. A low-latency query engine daemon 904 is installed at each data node 914, as depicted. The low-latency query engine daemon 904 includes a query planner 916, a query coordinator 918 and a query execution engine 920 in one embodiment. The query planner 916 turns query requests from clients into collections of plan fragments, and provides the planned fragments to the query coordinator 918. The query planner 916 may constitute the front end of the low-latency query engine, and may be written in Java, or another suitable language, to facilitate interaction with the rest of the Hadoop environment, such as the meta store/state store, APIs, and the like. The query planner 916 can use various operators such as Scan, Hash-Join, HashAggregation, Union, TopN, Exchange, and the like to construct a query plan. Each operator can either materialize or generate data or combine data in some way. In one implementation, for example, the query planner can create a leaf or tree of one or more operators (e.g., manually or using an optimizer). The scan operator allows a plan to be broken up along scan lines or boundaries. Specialized scan nodes may be present for all the different storage managers. So, for example, there may be an HDFS scan node and an HBase scan node, each of which can internally employ different processes for different file formats. Some plans combine data for hash aggregation which can fill up a hash table and then output the aggregate results. A union operator can merge the output from different plan fragments. A TopN operator can be the equivalent of or within the limit. The exchange operator can handle the data exchange between two plan fragments running on two different nodes.

The query coordinator 918 initiates execution of the planned fragments across all of the low-latency query engine daemons that are involved in the query. The query coordinator 918 uses the membership information from the state store and/or location information for the data blocks from the Name Node to determine or identify the low-latency query engine daemons on data nodes for executing query plan fragments. In one implementation, the query coordinator 918 can also apply any predicates from the query to narrow down to the set of files and blocks the plan fragments that should be run against. The query coordinator 918 can also perform the final aggregation or merge of data from the low-latency query engine daemons in remote nodes. In one implementation, the low-latency query engine daemons may pre-aggregate some of the data, so that the aggregation is distributed across the nodes, thereby speeding up the query.

The query execution engine 920 executes the planned query fragments locally on the HDFS and HBase. For example, the query execution engine 920 initiates the scan and/or any other query operators. The query execution engine 920 is written in C++, but may also be written in any other suitable language such as Java. The query execution engine is an execution engine that is separate from MapReduce. While the query execution engine uses the infrastructure that provides the data (e.g., HDFS and HBase), the query execution engine does not utilize any of the infrastructures that run map reductions, such as job trackers or task trackers.

In one embodiment, the query execution engine 920 can include a component 922, a low level virtual machine (LLVM), an optimizer, or other compiler infrastructure, for run-time code generation in order to transform interpretive code into a format that can be efficiently executed by the central processing unit (CPU). Typical relational database systems for instance, have interpretive code for evaluating expressions to extract data from indices etc. The query execution engine avoids this problem by using low level virtual machines (LLVMs) to more tightly couple code with hardware. For example, an expression where A equals B over A+B equals C in a query can be evaluated by making three function calls. Instead of making the three function calls, LLVM uses the operations that the CPU provides in order to evaluate the expression and achieve speed gains.

In a further embodiment, the low-latency query engine can also use special CPU instructions, in order to, for example, perform text processing and/or other resource intensive processes. By way of another example, hash value computations may be performed using a special Cyclic Redundancy Check (CRC32) instruction to achieve speed gains.

Figure 10:
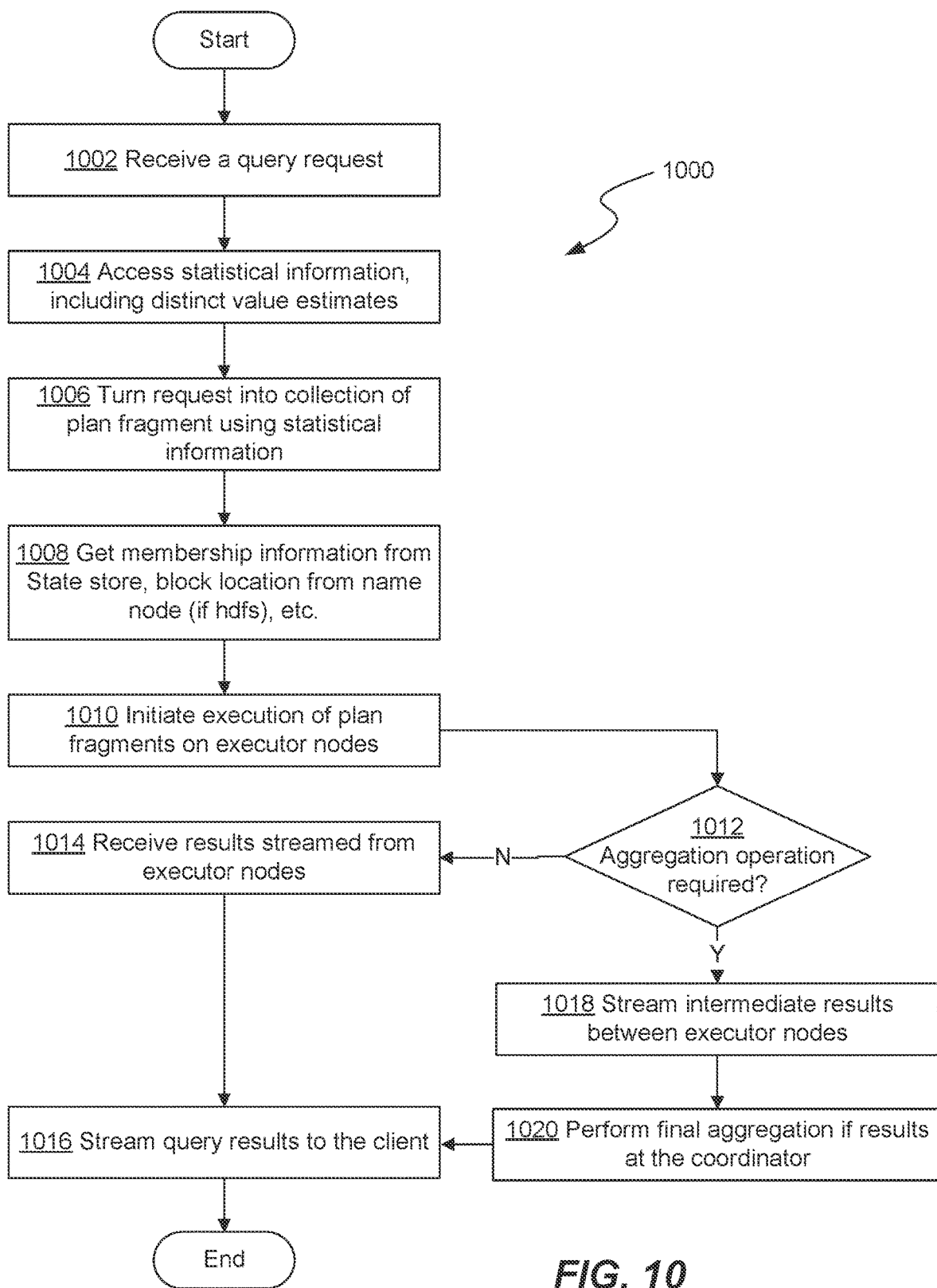
FIG. 10 depicts a flow chart illustrating an example method of processing an SQL query by a low latency query engine for Hadoop.

FIG. 10 depicts an example method 1000 of processing an SQL query using a low-latency query engine for Hadoop. As described above, an instance of the low-latency query engine runs on each node that has data (e.g., HDFS and HBase) in the Hadoop cluster. A user submits a query via a client (e.g., ODBC client/Hue/command line tool) to any of the low-latency query engine demons. Via the client (e.g., the ODBC client), the user can target any of the low-latency query engine daemons, by directly connecting to a particular low-latency query engine daemon on a data node. Alternately, a round robin strategy may be used to spread the load across all the remote daemons in the cluster.

In one implementation, at step 1002, a user facing side of a low-latency query engine daemon (i.e., a query planner) receives or accepts a query request from the user.

Next, at step 1004, the query planner accesses statistical information (e.g., from the Hive metastore database 706) regarding stored data for use in generating a query plan. The accessed statistical information may include one or more distinct value estimates determined, for example, using the disclosed technique. In some embodiments, statistics such as distinct value estimates are performed by a separate batch process and are made accessible to query planner for use at a time that a query is received. Alternatively, or in addition, statistics may be generated (in real-time or near-real-time) in response to receiving the query and/or in response to receiving a request for such statistics from the query planner. In some embodiments, the query planner may be configured to perform at least some of steps to estimate the number of distinct values in a given dataset.

At step 1006, the query planner turns the request into a collection of plan fragments using the statistical information, and hands off the query plan fragments to a query coordinator in the same node. The query coordinator serves as a single instance that coordinates the entire plan of execution across all other low-latency query engine daemons or remote daemons involved in the query. In one implementation, to coordinate the entire plan of execution, the query coordinator receives or obtains membership information from the state store and location information from the name node (for HDFS query) at step 1008. Using the membership information and the block location information, the query coordinator determines which daemons or nodes in the cluster should receive the query plan fragments for execution. At step 1010, the query coordinator distributes the query plan fragments to the nodes having relevant data to initiate execution of the plan fragments against the data local to each node.

During execution, all the nodes can talk to each other in a streaming fashion. In one implementation, if the query does not involve aggregation or blocking operators as determined at decision block 1012, results streamed from the query executors (i.e., query execution engines of nodes receiving the query plan fragments) are received by the query coordinator at step 1014. The results are then streamed back to the user via the client at step 1016.

Alternately, if a blocking or aggregator operator is present in the query, as determined at decision block 1012, intermediate results are streamed between the query executors and pre-aggregated at one or more the nodes at step 1018. At step 1020, the query coordinator performs an aggregation or merge of the pre-aggregated results to determine the final result, which is then sent to the user via the client at step 1016.

FIGS. 11A-11F depict example flows for query execution using a low-latency query engine for Hadoop.

Figure 11A:
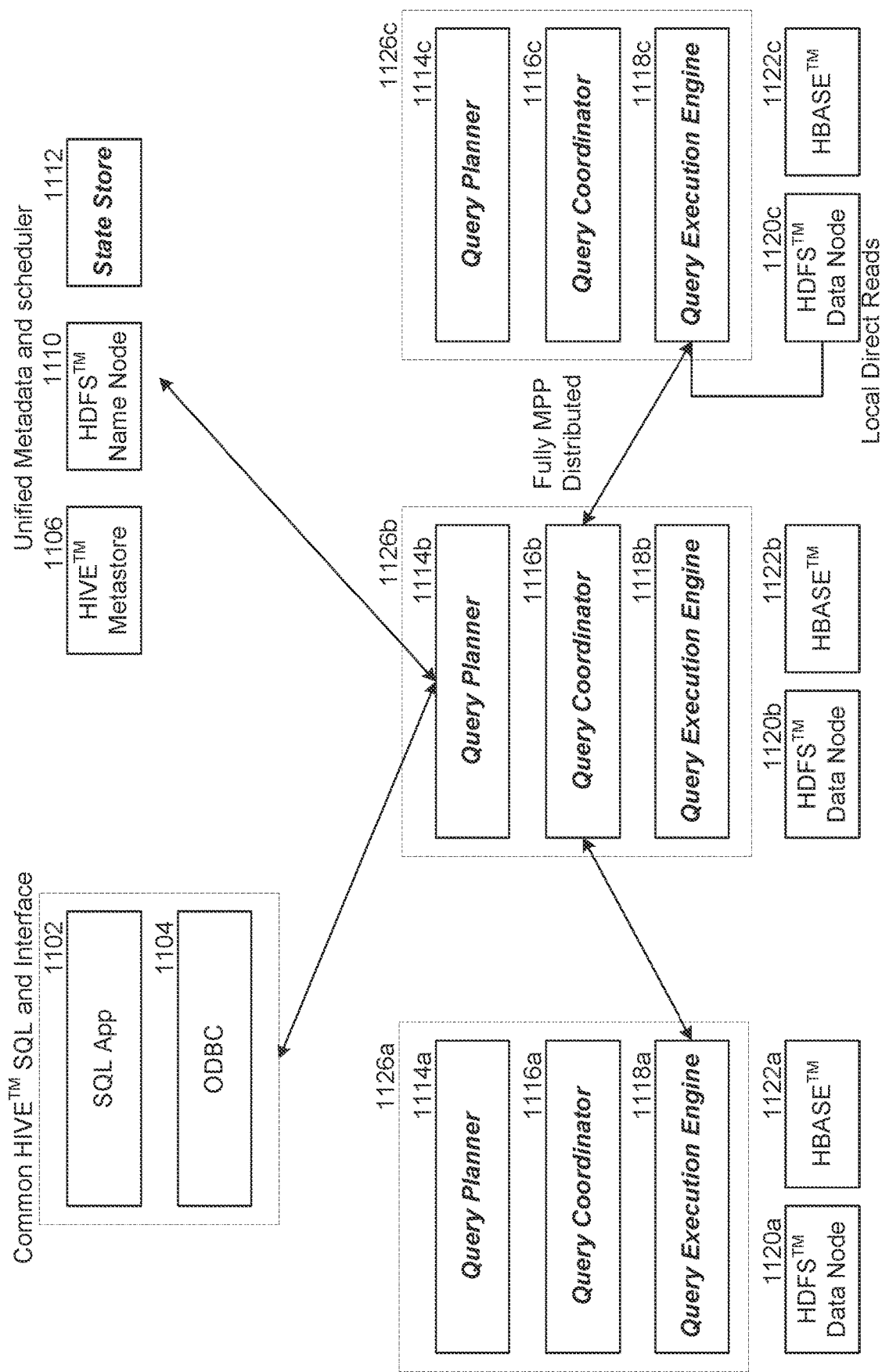
FIGS. 11A-11F depict example flows for query execution using a low latency query engine for Hadoop.

Referring to FIG. 11A, the Hadoop environment 1100 for operating the low-latency query engine includes a common Hive SQL and interface including an SQL application 1102 and a client 1104 such as the ODBC client, JDBC client, and the like. The environment also includes unified metadata and scheduler entities such as the Hive meta store 1106, YARN 1108, HDFS name node 1110 and/or state store 1112. As depicted in this example, the Hadoop environment includes a cluster of three HDFS data nodes 1120*a-c*, each of which has an instance of the low-latency query engine daemon 1126*a-c* respectively, running on top. The client connects to only one instance of the low-latency query engine daemon (e.g., 1126*b*). The low-latency query engine daemon connects to or communicates with one or more of the unified meta data and scheduler entities. Furthermore, as depicted, the low-latency query engine daemons connect to each other for distributed and fully massively parallel processing (MPP). It should be noted that low-latency query engine daemons 1126*a-c* on data nodes 1120*a-c* and the state store 1112 are the components of the low-latency) query engine that provides real-time, ad hoc query capability in Hadoop. The low-latency query engine leverages existing common Hive SQL and Interface 1102 and 1104, Hive metastore 1106, YARN 1108, HDFS name node 1110 and the unified storage layer comprising the HDFS data node 1120*a-c* and HBase region servers 1122*a-c*.

Figure 11B:
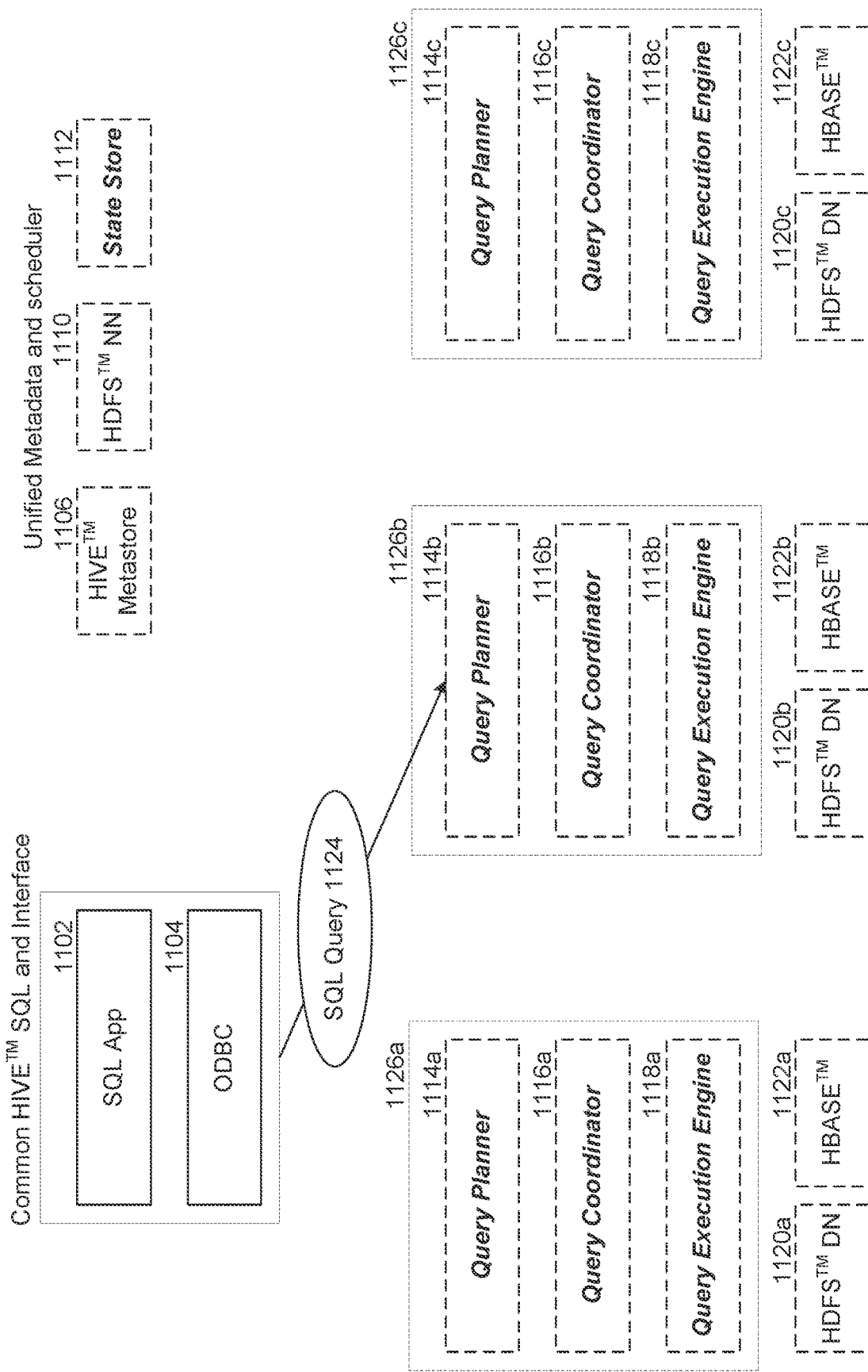

Referring to FIG. 11B, a user using the SQL application 1102 submits an SQL query request 1124 via a client 1104. The SQL query request can go to any of the nodes 1126*a-c*. In one implementation, the node to which the SQL query request should be sent can be specified via the client/application. Alternately, a node can be selected based on a round robin or other scheduling method for load balancing. An instance of the low-latency query engine daemon 1126*b* on the HDFS data node 1120*b* is depicted as the recipient of the SQL query request 1124. The SQL query request 1124 interacts with the query planner 1114*b* of the low-latency query engine daemon 1126*b*.

Figure 11C:
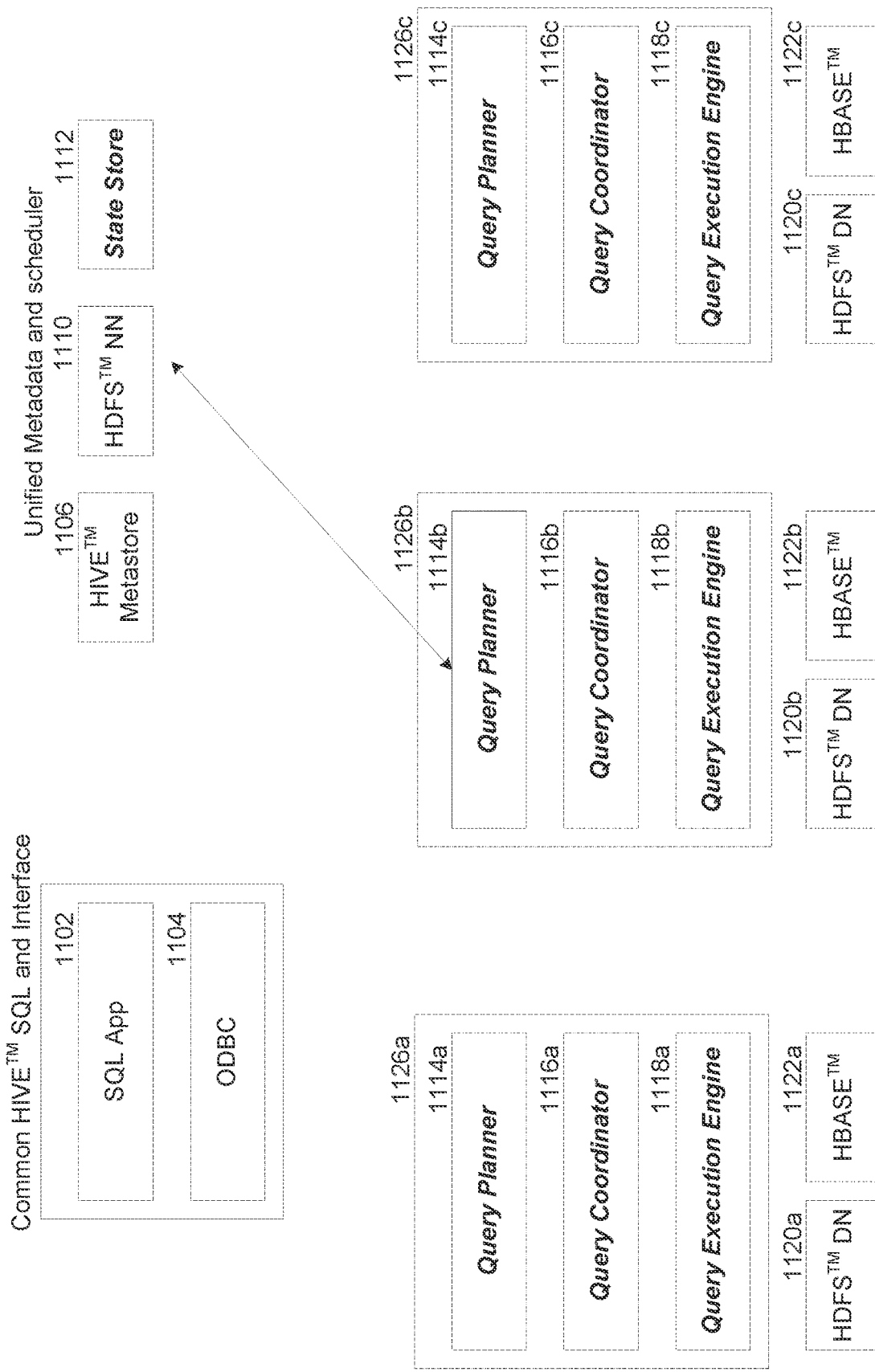

Referring to FIG. 11C, the query planner 1114*b* and/or the query coordinator 1116*b* that received the query request 1124, communicates with one or more of the unified metadata and scheduler entities to get information for creating a plan for the query request and/or coordinating execution of the query request. For example, the query planner and/or coordinator may determine which data nodes are available, and the location of data blocks relevant to the query. In HDFS, replicas of data blocks are stored in various data nodes. The query planner and/or coordinator can communicate with the name node 1110 to determine where each of the replicas for each data block is stored and can select one of the replicas to run the query. A round robin or another method may be used in selecting a replica from the group of replicas of data blocks. The query planner 1114*b* can parse and analyze the query request to determine tasks that can be distributed across the low-latency query engine daemons in the cluster.

Figure 11D:
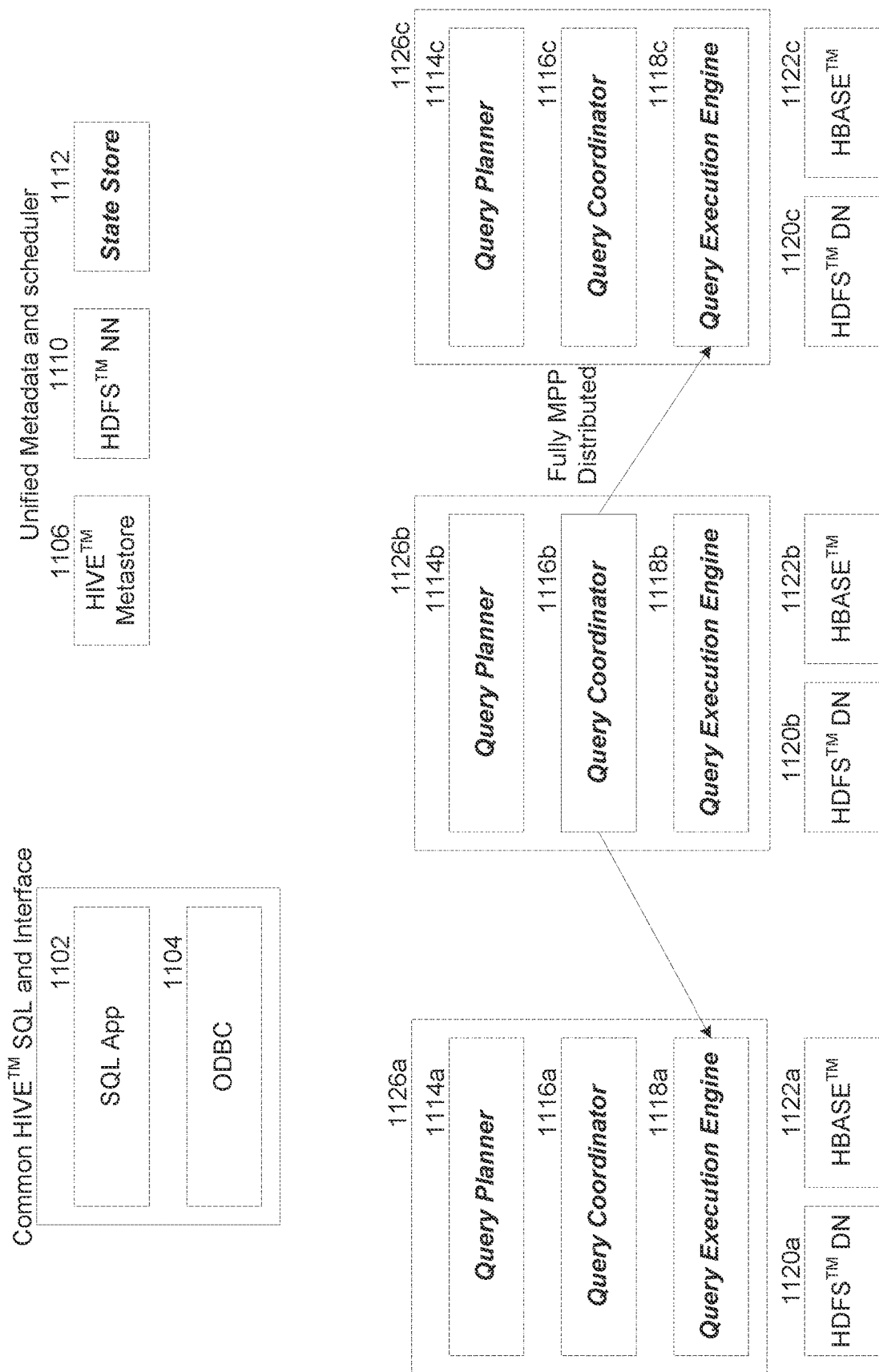
Figure 11E:
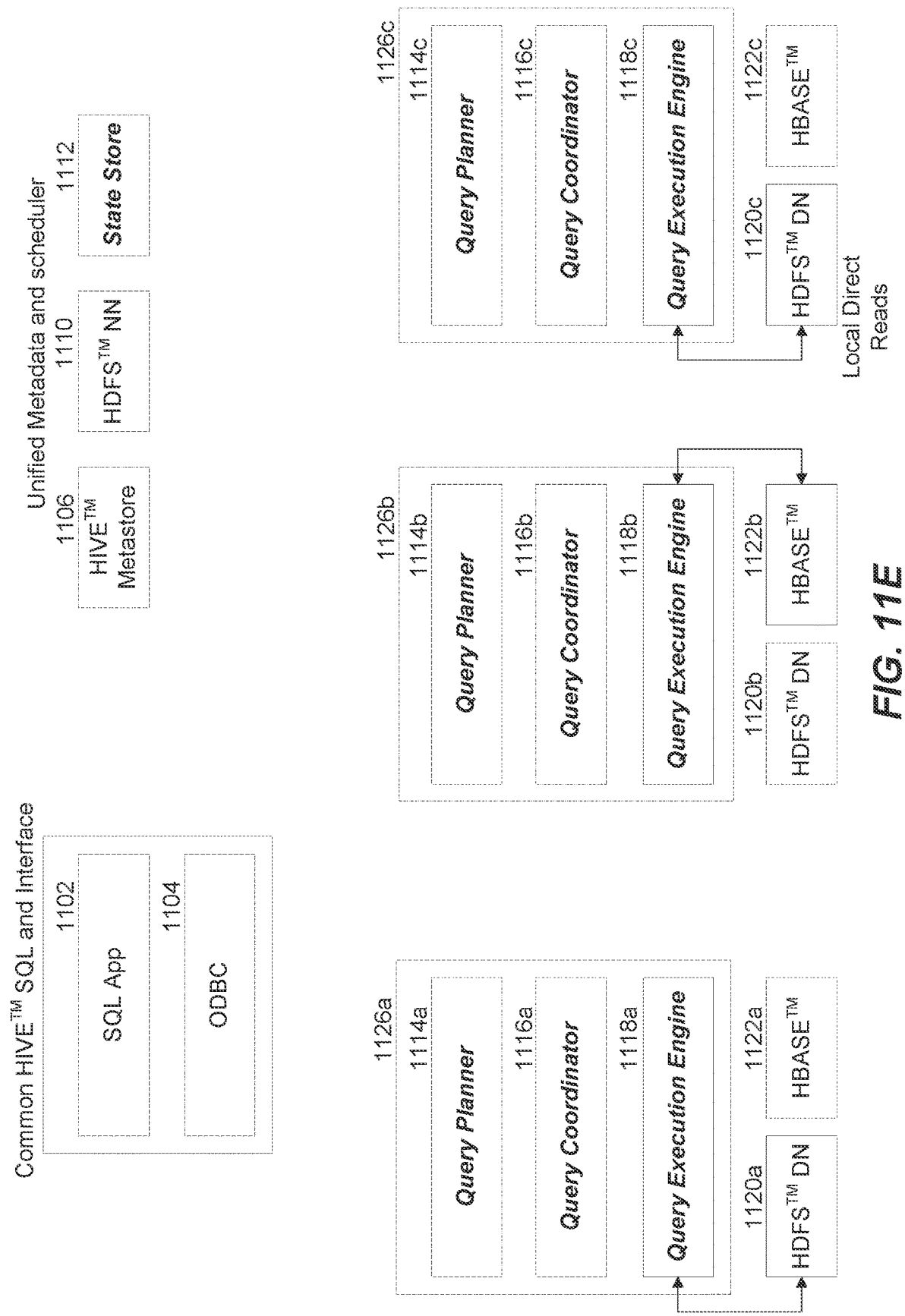

Referring to FIG. 11D, the query coordinator 1116*b* hands off the tasks or plan fragments from the query planner 1114*b* to the query execution engines 1118*a-c* of each of the nodes that hold data relevant to the query request. All three query execution engines run in parallel and distributed fashion. Referring to FIG. 11E, the query execution engines 1118*a-c* execute the plan fragments locally on the nodes that hold the relevant data. For example, the query execution engine 1118*c* performs a local direct read of HDFS data stored in HDFS data node 1120*c*. Similarly, the query execution engines 1118*a* and 1118*b* perform local direct reads of data stored in HDFS data node 1120*a* and HBase 1122*b* respectively. The query execution engines 1118*a-c* may also initiate other query operators specified in the plan fragments.

Figure 11F:
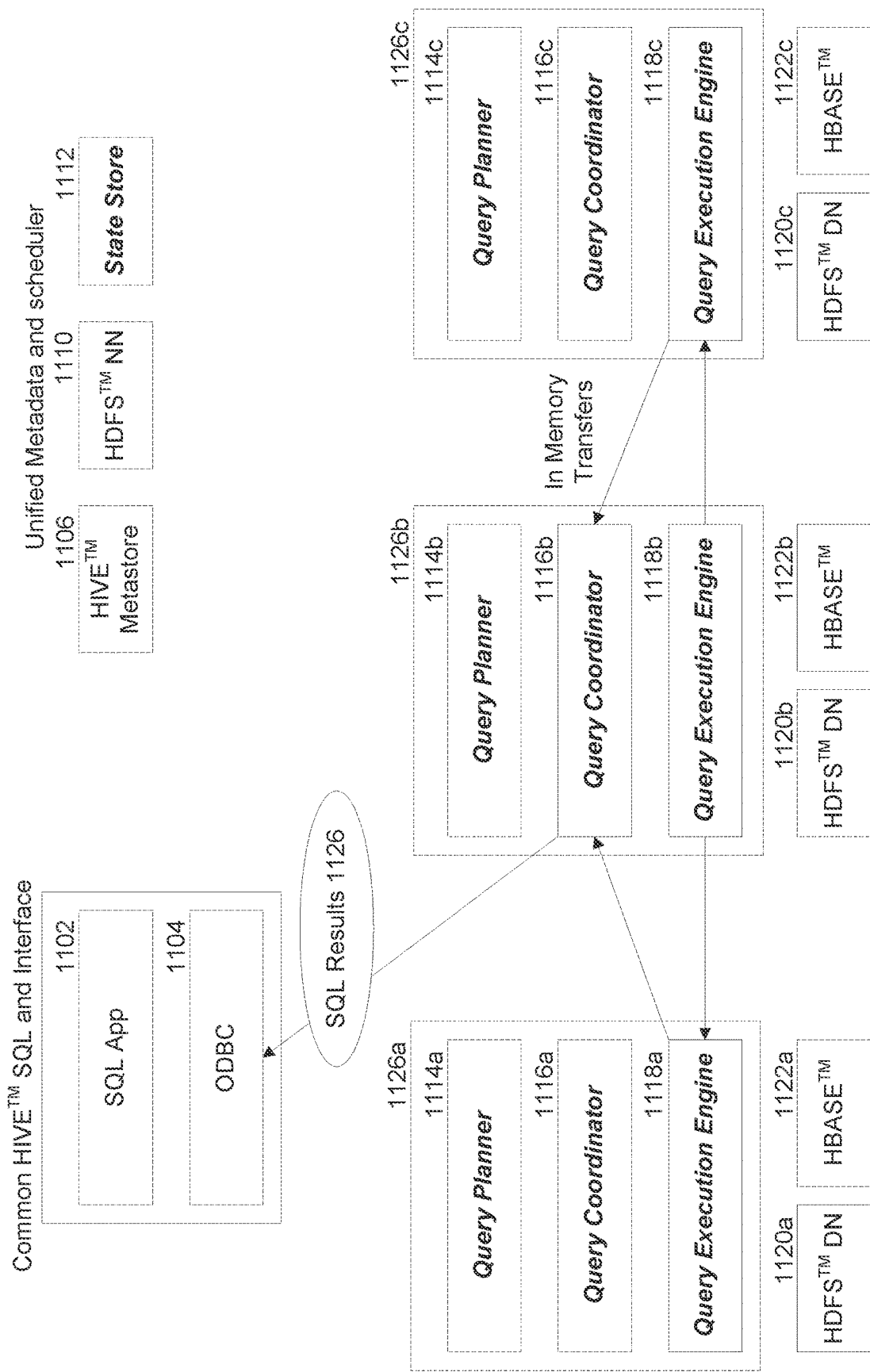

Referring to FIG. 11F, results from the query executions engines 1118*a-c* are passed to the query coordinator 1116*b* via in memory transfers. If the query involves block operations (e.g., TopN, aggregation, etc.), intermediate results are streamed between the RT query engine demon nodes for pre-aggregation, and the final result is aggregated at the query coordinator 1116*b*. Keeping query results or intermediate results in memory provides performance improvement as the transfers are not bound by the speed of the disks. The final result 1128 to the query request 1124 is then returned by the query coordinator 1116*b* to the user via the client 1104 and the SQL application 1102.

Example Processing System

Figure 12:
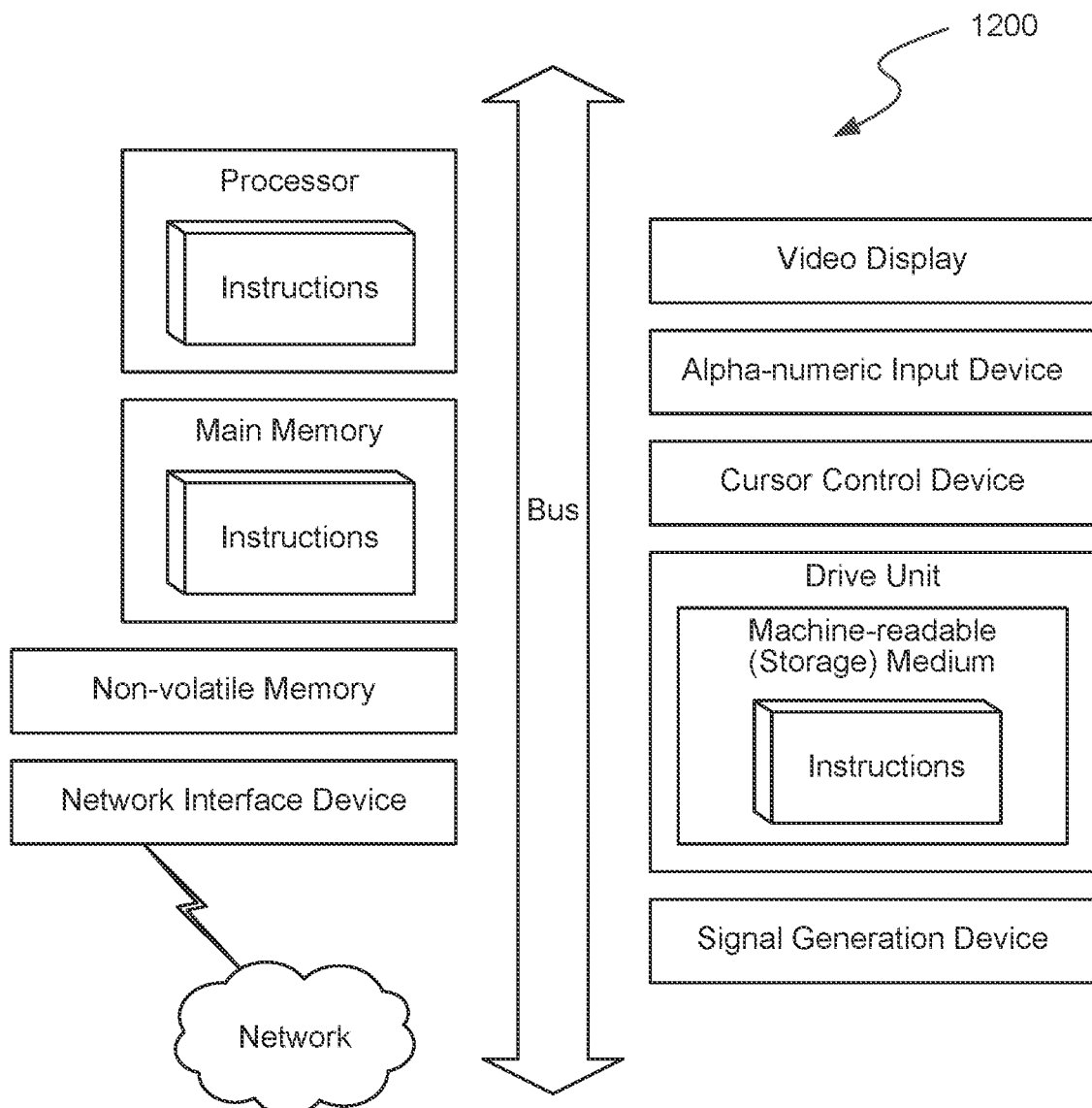
FIG. 12 depicts a diagrammatic representation of a machine in the example form of a computer system within which a set of instructions, for causing the machine to perform any one or more of the methodologies discussed herein, may be executed.

FIG. 12 shows a diagrammatic representation of a machine in the example form of a computer system within which a set of instructions, for causing the machine to perform any one or more of the methodologies discussed herein, may be executed.

In the example of FIG. 12, the computer system 1200 includes a processor, memory, non-volatile memory, and an interface device. Various common components (e.g., cache memory) are omitted for illustrative simplicity. The computer system 1200 is intended to illustrate a hardware device on which any of the components depicted in the example of FIG. 7 (and any other components described in this specification) can be implemented. The computer system 1200 can be of any applicable known or convenient type. The components of the computer system 1200 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 1200 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Disclaimers

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, mean any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method for low-latency dataset queries, the method comprising:
    receiving, by a query engine of a distributed computing cluster, a query for a dataset stored across the distributed computing cluster;
    obtaining, by the query engine, statistical information for the dataset, the statistical information including a number of distinct values in the dataset, wherein the number of distinct values is determined based on a two-dimensional extrapolation from multiple dataset samples each having a sample size and a probabilistic distinct value estimate;
    generating, by the query engine, an optimized query plan based on the statistical information; and
    returning, by the query engine, a query result in response to the query, the query result determined via multiple data nodes of the distributed computing cluster according to the optimized query plan.

2. The method of claim 1, wherein the query engine performs the two-dimensional extrapolation based on:
    plotting the multiple dataset samples within a two-dimensional space having a first dimension for value quantity and a second dimension for distinct value quantity;
    fitting a function to the multiple dataset samples plotted within the two-dimensional space; and
    determining the number of distinct values based on a total value quantity of the dataset and the function.

3. The method of claim 1, wherein obtaining the statistical information includes retrieving the number of distinct values from a metastore associated with the dataset.

4. The method of claim 1, wherein generating the optimized query plan includes determining multiple plan fragments and distributing the multiple plan fragments among the multiple data nodes for respective execution against dataset portions locally stored at each data node, wherein the multiple data nodes are identified according to block location information associated with the distributed computing cluster.

5. The method of claim 1, further comprising:
    aggregating fragmented results that are received by the query engine from each of the multiple data nodes to generate the query result.

6. The method of claim 1, wherein the query engine receives the query from a client application having a command line interface, wherein the query specifies the query engine out of multiple query engines instantiated in the distributed computing cluster.

7. The method of claim 1, wherein the query is received from a database connectivity client that implements an application programming interface (API) for a client to interface with the dataset, wherein the query engine that receives the query is selected from multiple query engines instantiated in the distributed computing cluster based on a load balancing process.

8. The method of claim 1, wherein at least some of the multiple dataset samples are artificial samples, the probabilistic distinct value estimate of each artificial sample being generated from a merging of respective probabilistic estimates of at least two other dataset samples.

9. The method of claim 1, wherein the multiple dataset samples include a particular number of artificial samples that are generated from initial samples scanned from the dataset, the particular number of artificial samples being based on a number of initial samples.

10. A low-latency query engine implemented on a data node of a distributed computing cluster, the data node including at least one processor and a memory storing instructions that, when executed by the at least one processor, cause the low-latency query engine to perform operations comprising:
    receiving a query for a dataset stored across the distributed computing cluster;
    obtaining statistical information for the dataset, the statistical information including a number of distinct values in the dataset, wherein the number of distinct values is determined based on a two-dimensional extrapolation from multiple dataset samples each having a sample size and a probabilistic distinct value estimate;
    generating an optimized query plan based on the statistical information; and
    returning a query result in response to the query, the query result determined via multiple data nodes of the distributed computing cluster according to the optimized query plan.

11. The low-latency query engine of claim 10, wherein a second query engine performs the two-dimensional extrapolation via (i) a function fit on the multiple dataset samples with respect to a two-dimensional space with a first dimension for the sample size and a second dimension for the probabilistic distinct value estimate, and (ii) an estimated total size for the dataset.

12. The low-latency query engine of claim 10, wherein generating the optimized query plan includes selecting the multiple data nodes according to membership information that identifies the multiple data nodes within the distributed computing cluster on which a query execution engine is instantiated.

13. The low-latency query engine of claim 10, wherein the query is a Structured Query Language (SQL) and is received from a database connectivity client that is connected to the low-latency query engine out of multiple low-latency query engines of the distributed computing cluster, wherein the low-latency query engine is coupled to the multiple low-latency query engines for massively parallel processing (MPP).

14. The low-latency query engine of claim 10, wherein the multiple dataset samples include artificial samples having probabilistic estimates that are merged from the probabilistic distinct value estimates of at least two other samples of the multiple dataset samples.

15. The low-latency query engine of claim 10, wherein the operations further comprise:
   determining the query result based on aggregating intermediate results that are received from the multiple data nodes via in-memory transfers.

16. A system comprising:
   a processor; and
   at least one memory storing instructions that, when executed by the processor, cause the system to:
      receive a query for a dataset stored across a distributed computing cluster;
      obtain statistical information for the dataset, the statistical information including a number of distinct values in the dataset, wherein the number of distinct values is determined based on a two-dimensional extrapolation from multiple dataset samples each having a sample size and a probabilistic distinct value estimate;
      generate an optimized query plan based on the statistical information; and
      return a query result in response to the query, the query result determined via multiple data nodes of the distributed computing cluster according to the optimized query plan.

17. The system of claim 16, wherein the instructions cause the system to:
   instantiate a low-latency query engine that connects to a database connectivity client to receive the query and return the query result.

18. The system of claim 16, wherein the instructions cause the system to:
   perform the two-dimensional extrapolation based on generating at least some of the multiple dataset samples through multiple scans of the dataset, wherein the probabilistic distinct value estimate of a given dataset sample is indicated by an estimator buffer based on one or more hash values.

19. The system of claim 16, wherein each of the multiple dataset samples is a bucket having a fixed memory length.

20. The system of claim 16, wherein the multiple dataset samples include first samples that are generated based on scanning the dataset and second samples that are generated based on merging at least two other samples of the multiple dataset samples, and wherein a total number of the multiple dataset samples satisfies a pre-determined threshold number.

* * * * *